US007921221B2

(12) United States Patent
Minborg et al.

(10) Patent No.: US 7,921,221 B2
(45) Date of Patent: Apr. 5, 2011

(54) METHOD AND APPARATUS FOR OBTAINING DIGITAL OBJECTS IN A COMMUNICATION NETWORK

(75) Inventors: Per-Ake Minborg, Stora Hoga (SE); Carina Dreifeldt, Stora Hoga (SE)

(73) Assignee: Minborg Invent I Goteborg AB, Goeteborg (SE)

( * ) Notice: Subject to any disclaimer, the term of this patent is extended or adjusted under 35 U.S.C. 154(b) by 200 days.

(21) Appl. No.: 12/017,717

(22) Filed: Jan. 22, 2008

(65) Prior Publication Data

US 2008/0177864 A1 Jul. 24, 2008

Related U.S. Application Data

(60) Provisional application No. 60/886,026, filed on Jan. 22, 2007.

(51) Int. Cl.
*G06F 15/16* (2006.01)
(52) U.S. Cl. .......... 709/231; 709/217; 709/219; 725/24; 725/34; 725/44; 725/87
(58) Field of Classification Search .............. 709/217, 709/219, 231; 725/24, 34, 44, 87
See application file for complete search history.

(56) References Cited

U.S. PATENT DOCUMENTS

| 4,450,477 | A | 5/1984 | Lovett |
| 5,371,551 | A | 12/1994 | Logan et al. |
| 5,438,423 | A | 8/1995 | Lynch et al. |
| 5,696,868 | A | 12/1997 | Kim et al. |
| 5,706,388 | A | 1/1998 | Isaka |
| 6,233,389 | B1 | 5/2001 | Barton et al. |
| 6,401,059 | B1 | 6/2002 | Shen et al. |
| 6,463,486 | B1 | 10/2002 | Parry et al. |
| 6,535,920 | B1 | 3/2003 | Parry et al. |
| 6,557,030 | B1 | 4/2003 | Hoang |
| 6,614,987 | B1 | 9/2003 | Ismail et al. |
| 6,647,417 | B1 | 11/2003 | Hunter et al. |
| 7,017,174 | B1 | 3/2006 | Sheedy |
| 2003/0120748 | A1* | 6/2003 | Begeja et al. ................. 709/217 |
| 2003/0140313 | A1* | 7/2003 | Smith ............................ 715/514 |
| 2004/0003101 | A1 | 1/2004 | Roth et al. |
| 2006/0146787 | A1 | 7/2006 | Wijnands et al. |
| 2007/0204011 | A1* | 8/2007 | Shaver et al. ................. 709/219 |
| 2008/0065691 | A1* | 3/2008 | Suitts et al. ................. 707/104.1 |
| 2008/0092156 | A1* | 4/2008 | Ferrone .......................... 725/13 |

OTHER PUBLICATIONS

International Search Report, International Application No. PCT/IB2008/000750, Aug. 20, 2008, 2 pages.
Hefflinger, digitalmediawire, "Cablevision to Test Server-Based Digital Video Recorder Service," http://www.dmwmedia.com/news/2006/03/31/cablevision-to-test-server-based-digital-vide..., Mar. 31, 2006.

(Continued)

*Primary Examiner* — Wing F Chan
*Assistant Examiner* — Hitesh Patel
(74) *Attorney, Agent, or Firm* — Goodwin Ptocter LLP

(57) ABSTRACT

With techniques for obtaining digital objects (e.g., songs or video clips) from information providers in data communication networks (e.g., the Internet), the digital objects typically being sent through channels (e.g., Internet radio channels or Internet TV channels), end-users gain several advantages over prior techniques. For example, end-users may easily locate desired digital objects, need not be connected during object capture, can be connected through a low speed connection, need not have a high capacity computer, can receive supplemental information associated with the digital objects, can quickly scan a vast number of digital objects having been sent earlier, need not have storage space for the digital objects available during object capture, can easily navigate through a multitude of digital object channels, can easily obtain objects with a certain desired quality and/or format, can legally obtain digital objects at no cost and can prove that the digital objects were actually obtained legally.

29 Claims, 10 Drawing Sheets

OTHER PUBLICATIONS

Lieberman, USATODAY.com, "Cablevision tests 'remote storage' DVR use," http://usatoday.printthis.clickability.com/pt/cpt?action=cpt&title=USATODAY.com+-+Ca..., Mar. 27, 2006.

Block, "Cablevision to rollout remote-storage DVR service," http://www.engadget.com/2006/03/27cablevision-to-rollout-remote-storage-dvr-service/, Mar. 27, 2006.

* cited by examiner

Search results:

Berlin
This Los Angeles-based synth pop group, founded by bassist John Crawford, singer Terri Nunn, and keyboard player David Diamond, made its first national impression with the...
en.wikipedia.org/wiki/Berlin

Berlin - Take my Breath away.mp3
This song is available in the MP3 format with 128 kbit/s bit-rate and was broadcasted by 977 the 80 th channel on the 11 th of January 2007 at 11 26 GMT
Artist = "Berlin", Album Title = "Top Gun", Year 1997, Track Number 2
Duration 00 03:55, Bit-rate 128 kbit/s, Channels 2, Audio Sample rate 44 kHz
en.wikipedia.org/wiki/Take_My_Breath-Away
Pre-listen   Download   Play full song   Buy this song Berlin - Some other song.mp3
This song is available in the MP3 format with 128 kbit/s bit-rate and was broadcasted by 977 the 80 th channel on the 10 th of January 2007 at 10:13 GMT
Artist = "Berlin", Album Title = "Top Gun", Year 1997, Track Number 5
Duration 00 04:32, Bit-rate 128 kbit/s, Channels 2, Audio Sample rate 44 kHz

Figure 9

METHOD AND APPARATUS FOR OBTAINING DIGITAL OBJECTS IN A COMMUNICATION NETWORK

RELATED APPLICATIONS

This application asserts priority under 35 U.S.C. §119(e) to U.S. Provisional Patent Application No. 60/886,026, entitled "Method and Apparatus for Obtaining Digital Objects in a Communication Network," filed Jan. 22, 2007, which is hereby incorporated by reference in its entirety.

FIELD OF THE INVENTION

The present invention relates generally to methods and apparatus for obtaining digital objects in a communication network. More specifically, the invention relates to a communication system, which connects to a private or public data communication network (such as the Internet) and provides end-users a means to obtain digital objects (such as audio and video clips). In many jurisdictions the recording of digital objects emanating from certain sources (e.g. Internet radio stations and TV broadcasters) is fully legal as opposed to file-sharing, the later being a wide spread phenomena today.

BACKGROUND OF THE INVENTION

The present evolution of data-communication is such that more and more users are gaining access to the Internet worldwide. Internet has become a source of knowledge, but also a marketplace for business; attracting more and more users. Currently, there is significant pressure on the data-communications industry to provide solutions that allow everyone to gain access to Internet. Broadband solutions are continuously being developed; both local as well as national access networks have been planned and launched. Users are connecting to the Internet via various connection types such as fibre channels, cable TV lines, xDSL, Ethernet, GSM, UMTS, WiFi and satellite systems.

Numerous information providers are present on the Internet providing all kinds of services. The vast amount of information objects has lead to the fact that specific search engines are used by virtually all Internet users to be able to locate relevant information objects. For static and semi-static content on the Internet, there are several search engines available (e.g. Google and Yahoo) that provide comprehensive coverage over large parts of the Internet. However, currently, there is no successful method to navigate through streaming media. There is no uniform way to search the streams and by their nature they are volatile.

Seemingly ubiquitous human behaviour, not wanted in the real world, such as theft, blackmail, sabotage and violations of immaterial product and copyright rights, has spread throughout the Internet community. Currently there exists a huge debate amongst producers and consumers of digital media and amongst law enforcement organizations. Major concerns touch on what is considered legal or moral when it comes to the means of obtaining music and films.

Users on the Internet are facing a number of problems when they are about to retrieve digital objects from the net. For example, users that are looking for music face at least the following difficulties: it is not easy to locate a certain song, the song may not have the required quality, the song may cost money, the format of the song must be correct, the song may not be available instantly, the retrieval of the song may require that the users communication device is on and connected to the Internet, the communication device must have sufficient storage space available, the legal status of the song may be uncertain, the song may not be transferable to other devices (e.g. mp3 players). The same is true for other types of media such as video, text and data.

A couple of products and services have attempted to solve these problems but have been unable to fully provide users the ability to navigate and browse the vast amount of content available on modern networks such as the Internet. One of these services is Video-on-Demand (VOD). VOD service provides a selection of media files for a user to browse over a dedicated connection, such as a cable network. Unfortunately, the media files available to users must be pre-determined by the service provider and pre-loaded into the service provider's dedicated servers. This forces the VOD user into a drastically limited selection of files to view. Further, this only allows the VOD user to view files on the VOD system's dedicated device, such as a cable box, and on the dedicated system; a user cannot view the files outside of that system.

A second product that has tried to solve consumers' need for unfettered access to media is the Digital Video Recorder (DVR). One of the well known DVR products is the Tivo. These products allow a user to schedule a recording of a TV show in advance, and allow the user to use VCR-like functions when watching that show (e.g., pause, rewind, fast forward). Some cable companies have considered locating these DVRs in a central location at the cable company. Unfortunately, DVR technology suffers from serious disadvantages. First, DVRs, like VOD services, are limited to the content available on the dedicated connection those DVRs receive (e.g., satellite or cable networks). A DVR cannot actively seek out new forms of media beyond what is predetermined to be available by the dedicated service provider; not to mention being able to browse the offerings of multiple service providers. Second, DVRs are individually owned and managed, in that they require excessive bandwidth in order to operate for a vast user network. For example, if X users want to record a specific program, X connections to the media are required on the dedicated connection; this is the case regardless of location of the DVR. Third, DVRs are only able to operate because off of scheduling information the DVR receives well in advance of the scheduled recording; information that many content providers on the internet do not or cannot provide in such a manner.

Data aggregation services have also been developed. These services, some of which rely on the RDF Site Summary (RSS) feed, allow a user to receive updates or summaries of information presented on the Internet. RSS services are predominantly used in the context of blogs and news sites, where a user only wants to see new information. Unfortunately, while an RSS feed may be able to present updates to a previously subscribed news service or blog to a user, RSS technology is not able to search and aggregate media from providers unknown to the RSS user. This is because the RSS user must set-up the RSS feed to connect directly to a provider before that feed can have any effect. Another disadvantage is that the content provider must enable RSS technology on the server-side of the connection in addition to the client. Many content providers are either unable or unwilling to allow this kind of access to their content. Further, similar to the DVR product, bandwidth issues crop up in that an RSS feed is delivered to each user individually.

Applicants have identified that there are several problems in the present way of accessing the Internet and searching for specific digital objects and subsequently obtaining them because of several reasons described above and hereunder. Several novel solutions have been devised to overcome these problems.

Other problems and drawbacks also exist.

SUMMARY OF THE INVENTION

According to one embodiment, the invention comprises a system and method for receiving a request for a media object, searching one or more undedicated media streams, locating the media object on an undedicated media stream, recording a copy of the media object from the undedicated media stream, and making the copy available to a remote user. The various embodiments may allow the user to be disconnected from the system while recording takes place.

The present invention relates generally to methods and apparatus for obtaining digital objects in a communication Network. More specifically, the invention relates to a communication system, which connects to a private or public data communication network (such as the Internet) and provides end-users a means to obtain digital objects (such as audio and video clips). In many jurisdictions the recording of digital objects emanating from certain sources (e.g. Internet radio stations and TV broadcasters) is fully legal as opposed to "file sharing", the later being a wide spread phenomena today.

When the present invention is implemented, a user may enter search criteria, such as song or artist, and then just wait for a while and a legal recording of a song will be obtained automatically. In variants of the invention, the user does not even have to be connected to the Internet during the search and retrieval of the song. This allows end-users a convenient way of obtaining legal copies of music. The invention is not restricted to just music. Instead, end-users may obtain a multitude of different media types such as audio, video, data and text.

The present invention is in no way limited to the Internet or its current state. All the methods and apparatus may be applied in other data communication networks providing communication means between two or more distinct places. In fact, one would expect that the current invention would suit even better in future communication systems with higher bandwidths and more information providers.

The present invention has numerous benefits and advantages. The invention provides an efficient and effective to search the vast amount of media streams available on the Internet. It also allows users to find digital objects that comport with legal principles of the users' jurisdictions.

Other benefits and advantages of the invention will be apparent to the person of ordinary skill in the art.

Accordingly, it is one object of the present invention to overcome one or more of the aforementioned and other limitations of existing systems and methods for media presentation inherent those systems.

It is another object of the invention to provide a system and method for providing legal way to find media on the Internet.

It is yet another object of the invention to provide a media browsing system that is simple to use and time-efficient for the user.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, including the figures, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 9 illustrates a communication system according to variants of the invention with user interaction with the system;

DETAILED DESCRIPTION OF THE INVENTION

Figure 1:
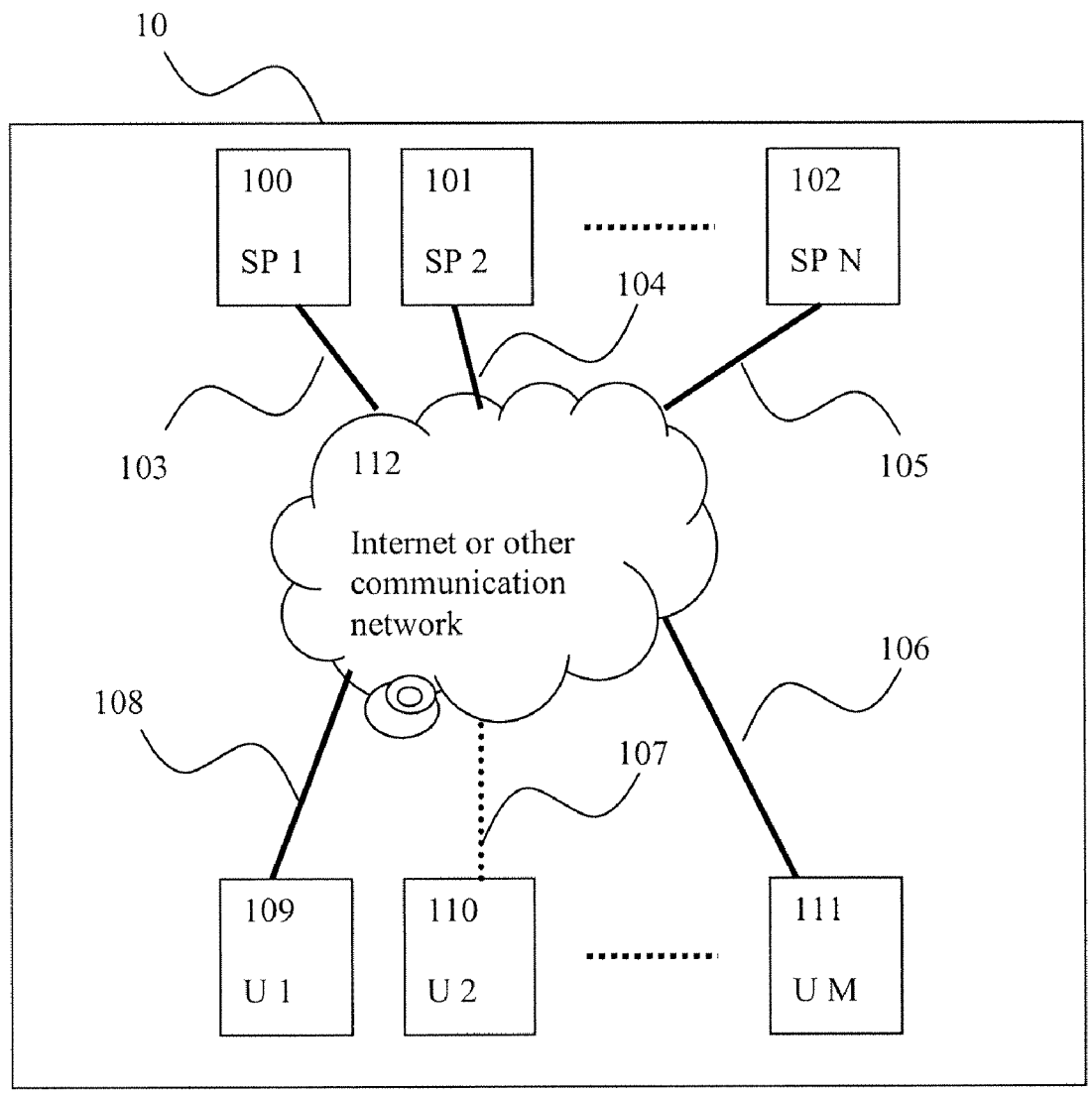
FIG. 1 illustrates a communication system where a number of different communication networks and nodes are interconnected according to the current state of the art.

Embodiments of the present invention are directed to . . . .
Definitions
In order to simplify the description below, several definitions are made hereunder:
End-User Properties (Hereafter Denoted EUP)

According to various aspects of the invention, an end-user's properties may be constituted by any combination and/or permutation of one or several properties, including but not limited to; a system unique identifier (id), her real name, date of birth, gender, body size(s) (e.g. length, waist), citizenship, location, country where she lives, preferred language(s), installed program(s), program settings, preferred way(s) of conveying obtained digital objects (e.g. e-mail, IM address, web, local storage), alias name, password, picture(s) depicting herself, presentation picture(s) (not necessarily constituting the appearance of the end user), instant messaging (IM) address(es), IP address(es), MAC address, TCP/UDP port address(es), device type(s), browser user agent(s), operating system(s) used, willingness to receive ads, cookies and/or content stored by browser user agents, GUID number (e.g. {3F2504E0-4F89-11D3-9A0C-0305E82C3301}), e-mail address, phone number, zip/postal code, encryption keys(s), last login date and/or time, MSISDN (for wireless devices), time zone on the user's current location, time zone on the user's home location, content stored at a database at the users premises.

Digital Object Channel Properties (Hereafter Denoted DOCP)

According to various aspects of the invention, a Digital Object Channel's properties (or short a "channel") may be constituted by any combination and/or permutation of one or several properties, including but not limited to; a system unique identifier (id), a station name, a digital coding type (DCT as described below), a maximum number of users that may connect to the digital object channel, the current number of users currently connected to the digital object channel, an indication of the technology and/or hardware used to provide the channel (e.g. number of CPUs, Memory size, use of cluster technology, net communication throughput), indication of presence of commercial information in the channel, current digital object being transmitted, a description of the channel transmission properties, the current bit-rate, the maximum bit-rate, the average bit-rate, the use of error correction, the communication protocol(s) used to convey digital objects (CP as described below), a rank of the channel's popularity, the genre of digital object being transmitted (e.g. rock, pop, disco, news TV), a description of the probability for certain digital objects to appear in the stream (e.g. morning news, music, "Beatles"=2%), a description of the author of the current digital object being provided in the channel, a description of the performer(s) in the current digital object being provided in the channel (e.g. artist), a description of the name of the current digital object being provided in the channel (e.g. song name), a URL associated with the channel (e.g. a homepage of the channel or channel provider), a communication descriptor used to initiate a channel, an Internet address used to initiate a channel, an IP number used to initiate a channel, a port address used to initiate a channel, an encryption key needed to initiate a channel, a password needed to initiate a channel, a know secret needed to initiate a channel, a picture associated with the channel, an indication of the legality of obtaining and/or storing objects sent in the channel, the time when the channel is active, time zone where the channel is produced, any set of parameters describing digital rights or restrictions a user might have when storing or playing Digital Objects emanating from the channel (e.g. DRM)

Service Provider Properties (Hereafter Denoted SPP)

According to various aspects of the invention, a Service Provider's properties may be constituted by any combination and/or permutation of one or several properties, including but not limited to; a system unique identifier (id), its country of registration, its digital object channel(s) (said DOCP(s)), its legal jurisdiction, its name, its legal name, its registration identity, picture(s) depicting its logo, presentation picture(s) (not necessarily constituting the appearance of the service provider's logo), instant messaging (IM) address(es), IP address(es), MAC address, TCP/UDP port address(es), e-mail address, phone number, zip/postal code, encryption keys(s), time zone on the service provider's location.

Note that, in some of the various embodiments and aspects, a said DOCP can be described also as a said SPP (since the latter may contain one or several DOCPs).

Digital Object Properties (Hereafter Denoted DOP)

According to various aspects of the invention, a digital object's properties may be constituted by any combination and/or permutation of one or several properties, including but not limited to; a system unique identifier (id), its title, date of creation, time of creation, content type (e.g. MIME:audio/mp3), URL, land of creation, author, artist(s), language(s), alias name, picture(s) depicting it, picture(s) depicting an album on which the digital object was released, presentation picture(s) (not necessarily constituting the appearance of the digital object), copyright holder, copyright existing flag, protection flag, content (e.g. the digital object content, for example the actual sound in an audio clip), checksum, digital signature, pointer to original digital object, album title, track number, genre (e.g. blues, rock, classical), lyrics, comments, duration, bit-rate, audio channels, object coding, audio coding, video coding, audio sample rate, video frame rate, image width, image height, image resolution, compression method, encryption method, encryption key, sample depth (e.g. bits), text coding, thumbnail picture, extraction of audio, extraction of video, its DOT (as defined below), any set of parameters describing digital rights or restrictions a user might have when storing or playing/rendering the Digital Object (e.g. DRM)

Digital Object Types (Hereafter Denoted DOT)

According to various aspects of the invention, digital objects can represent a plurality of different media types constituted by any combination and/or permutation of one or several media types, including but not limited to; audio, video, pictures, stock information, news, text, digital documents, tv, weblog (blog), podcast, web pages, or similar and/or derivates of these media types. The digital object type can be coded and/or tagged in many ways, including the MIME format.

Communication Protocols (Hereafter Denoted CP)

According to various aspects of the invention, digital objects can be conveyed using a plurality of different communication protocols constituted by any combination and/or permutation of one or several communication protocols, including but not limited to; streaming media protocols, RTP, ftp, http, https, RSS, SMTP, e-mail, instant messaging (IM), NFS, SMB, remote file system protocols, tcp, udp, Ipv4, Ipv6, SIP, DVBT, DAB, CEPT, BitTorrent, Fast Track, Direct Connect, Gnutella and eDonkey, mms, or similar and/or derivates of these communication protocols.

Digital Coding Types (Hereafter DCT)

According to various aspects of the invention, digital objects can be coded using a plurality of different coding formats constituted by any combination and/or permutation of one or several communication protocols, including but not limited to; mp3 (MPEG-1 Audio Layer 3), AAC, AAC+, Ogg Vorbis, mp2, mp3PRO, AC-3, ATRAC, QDesign, AMR-WB+, RealAudio, speex, CELP, zip, mpg2, mpg4, pcm, XML, Flash, FLAC, Monkey's audio, SHN, TTA, WavPack, Apple Lossless, AIFF, AU, WAV, G.711, G.722, G.722.1, G.722.2, G.723, G.723.1, G.726, G.728, G.729, G.729.1, G.729a, Microsoft Windows Media file format, WMA, BMP, GIF, ILBM, PCX, PNG, TGA, TIFF, WMP, JPEG, JPEG 2000, JPEG-LS, JBIG, JBIG2, MPEG-, MPEG-2, MPEG-4, MPEG-4/AVC, H.261, H.262, H.263, H.264, AVS, Bink, Dirac, Indeo, MJPEG, RealVideo, VC-1, Theora VP6, VP7, WMV, 3GP, ASF, AVI, FLV, Matroska, MP4, MXF, NUT, Ogg, Ogg Media, QuickTime, RealMedia or similar and/or derivates of these coding formats.

Meta-data is data associated with a digital object and can be embedded with the digital objects (e.g. ID3 tags in mp3 files) or can be otherwise associated with the digital object (e.g. storing information elements in a database and associate the information elements to one or several digital objects or obtained from another store (such as CDDB or a web server)). For example, a meta-data information element may define the author of a song.

Triggering

According to various aspects of the invention, the process of triggering on a certain event will be used. In one or several variants of the invention, the triggering process comprises the following steps:

determining a certain set of one or several search criteria (hereafter triggering conditions) pertaining to a desired digital object or digital objects, the triggering condition being one or several of said DOP, DOCP, SPP, DOT, CP or DCT satisfying certain variables and relations (for example {objecttype=music, artist="U2", format=mp3, bitrate>64 kbit/s}), entering the triggering condition(s) set in the system, monitoring any object properties and comparing they within the triggering condition(s) set within the search scope (e.g. one or several digital object channel), the object properties being any of the said DOP, DOCP, SPP, DOT, CP or DCT, upon a match, inform an application in the system.

For example, if the above search criteria were entered, the system may trigger on {song="Sunday bloody Sunday.mp3", format=mp3, bitrate=128 kbit/s, channel="http://station.someserver.com/rock:8000"} or {song="one.mp3", format=mp3, bitrate=128 kbit/s, channel="http://station.someotherserver.com rock:4001"}.

The above process may be referred to as "triggering", "trigger", "triggered" or similar wording depending on language context.

The term "triggering conditions" may also referred to in this document.

It shall be noted that "triggering" may be applied such that triggering conditions are compared to real time object properties arriving in some part of a system but just as well, in certain variants of the invention, such that triggering conditions are compared to object properties being stored before the triggering conditions were applied or entered (e.g., searching for an object in a database for all the songs written by a certain author, whereby the songs were recorded in advance of the search).

Digital Object and/or Channel Adaptation (Hereafter DOCA)

According to various aspects of the invention, digital objects and digital object channels over which they are sent may be handled or adapted so it may fit the end user's requirements or other requirements better. This includes, but is not limited to; compression of the digital object such that its digital representation will be reduced in size, changing the object coding format of the digital object (from any format in said DCT to another or same format in said DCT), changing the speed of the digital object channel (e.g. to reduce bandwidth requirements or to reduce the time to convey the digital object), changing the communication protocol (from any protocol in said CP to another or same format in said CP), changing the digital object channel properties (from any digital object channel property in said DOCP to another or same property in said DOCP), changing the service provider properties (from any service provider property in said SPP to another or same property in said SPP), changing the time the digital object is transmitted, splitting a digital object in several parts.

The Prior Art

FIG. 1 illustrates a communication system 10, where a number of different communication networks and nodes are interconnected according to the current state of the art. Several information providers have communication devices (e.g. servers) connected to a communication network such as the Internet. For example; service provider SP1 has a communication device 100 that connects to a communication network 112 via a communication link 103, service provider SP2 has a communication device 101 that connects to a communication network 112 via a communication link 104 and so forth until service provider SPN that has a communication device 102 that connects to a communication network 112 via a communication link 105. There are communication networks similar to 10 where N is substantially larger than 10,000.

The N communication devices of the service providers (100, 101 through 102) are typically, but not necessarily, characterized by their comparatively high computational power, data throughput, large memory and persistent storage size, and significant robustness in terms of up time.

The N communication links (103, 104 through 105) are typically, but not necessarily, characterised by their comparatively high bandwidth throughput, their significant robustness in terms of up time and supervision, and by its predictability of behaviour that remains largely constant over time.

Several end-users have communication devices (e.g. PCs, laptops, or wireless devices) connected to a communication network such as the Internet. For example; end-user U1 has a communication device 109 that connects to a communication network 112 via a communication link 108, end-user U2 has a communication device 110 that connects to a communication network 112 via a communication link 107 and so forth until end-user UM that has a communication device 111 that connects to a communication network 112 via a communication link 106. There are communication networks similar to 10 where M is substantially larger than 1,000,000.

The M communication devices of the end-users (109, 110 through 111) are typically varying significantly in terms of computational power, data throughput, memory and persistent storage size, and robustness in terms of up time. Some end-users are running on a communication device with characteristics similar to 100, whereas others end-users are communicating through hand-held devices with small screens, reduced memory size and low computational power.

The M communication links (103, 104 through 105) are typically varying significantly in terms of bandwidth throughput, robustness in terms of up time, supervision, and predictability of behaviour that may vary significant over time. Some end-users are connected via a communication link with characteristics similar to (103), whereas others are connected via wireless connections with low-speed, periodical outages, unpredicted behaviour, and with its major properties varying significantly over time.

There are communication systems similar to 10, where the number of end-users (M) is significantly higher than the number of service providers (N), such that M>N*100.

The service providers provide digital objects including but not limited to audio and video in many ways. Digital objects may, for example, be conveyed using the http protocol (such as the ShoutCAST protocol does) coded in the mp3 format.

The digital objects are often provided in digital object channels such as a radio or TV channel. A service provider typically provides several different digital object channels.

Figure 2:
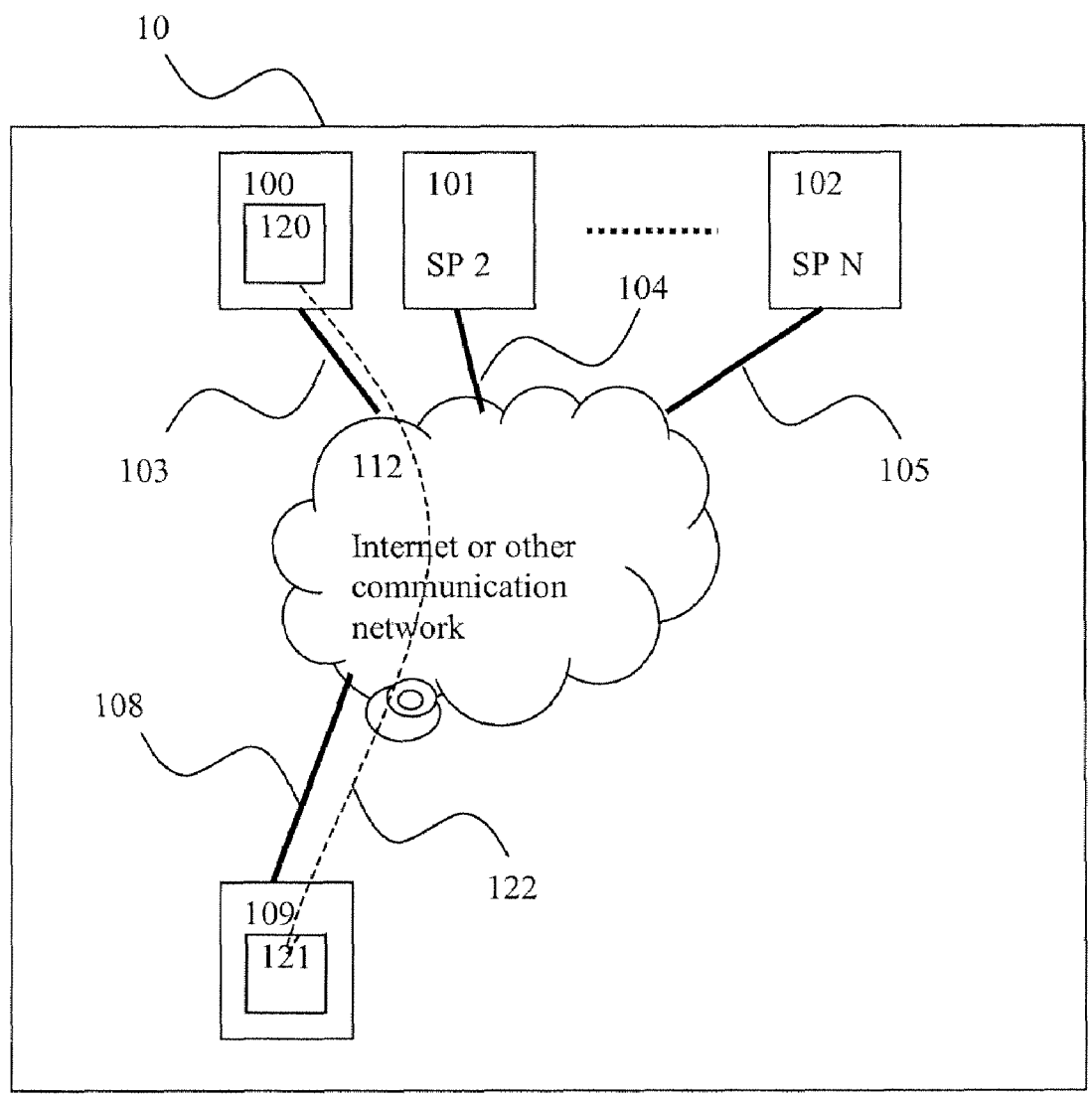
FIG. 2 illustrates a more detailed communication system where a number of different communication networks and nodes are interconnected according to the current state of the art.

FIG. 2 shows a communication system 10, where user U1 with communication device 109 has set up a communication channel 122 with SP1 in order to obtain digital objects. User U1 has an application 121 (e.g. Microsoft Media Player or Winamp) installed and running on her communication device. The application 121 connects to a channel feed application 120 on the object server 100 via the channel 122, the channel 122 being fed with digital objects via the channel feed application 120. As digital objects are passed from the channel feed application 120, via the channel 122 to the application 121, the later renders and/or stores the digital objects. Rendering can be made in real-time, near real-time or substantially later. The channel 122 is conveyed over the communication channel 108, the communication network 112 and the communication link 103.

As will be apparent by the observant reader, several disadvantages are now imposed on the end-user U1, the end user's communication device 109, the communication link 108, the communication network 112, the communication links 103-105, the application 121, the channel feed application 120 and the channel 122.

Suppose the end user U1 is looking for a particular digital object (such as a certain song, a song made by a certain artist, a certain film, etc), which she wants to be stored, stored via and/or rendered at the end user's communication device. Most service providers have services where digital objects are transmitted in a way that the order and time digital objects are transmitted are non-deterministic by end-users in advance (e.g. radio channels). Also, the bandwidth of the channel 122 is limited (often to what can be rendered in real-time) and the objects are only available momentarily (e.g. streaming digital objects). Bandwidth is further limited by/consumed in the communication link 102, the communication link 108 and the communication network 112.

One approach would be to continuously monitor one channel (such as 122) and wait until a desired object is deemed to be in the channel. Upon detection of the object, the object can be obtained for later storage and/or rendering at the user U1. Unfortunately, since the bandwidth of 103, 108, 112 and 122 is limited, the expected time to get a desired object would be substantial, especially if the desired digital object is transmitted with low frequency (for example a user would probably have to wait several years to capture the song "Mary had a little Lamb" on a rock radio station).

The user could alleviate this slightly by selecting a digital object channel with higher probability of sending the desired digital object (e.g. selecting a children's channel instead of a rock channel). However, this would require the user to have prior knowledge of the digital object probabilities distributed over the different channels available from a plurality of information providers, each potentially providing a substantial number of different channels.

Another disadvantage to this system is that the communication link 108 may be slow and with intermittent availability, reducing the user's probability to obtain a desired digital object with full integrity.

Further, the time from when the information providers disclose the desired digital objects' properties (e.g. the name of the song) to the actual transmission of the digital object, may be too short for the application (121) to be able to obtain the entire desired digital object. Some information providers do not even disclose any (or insufficient to determine triggering of recording) object properties.

Figure 3:
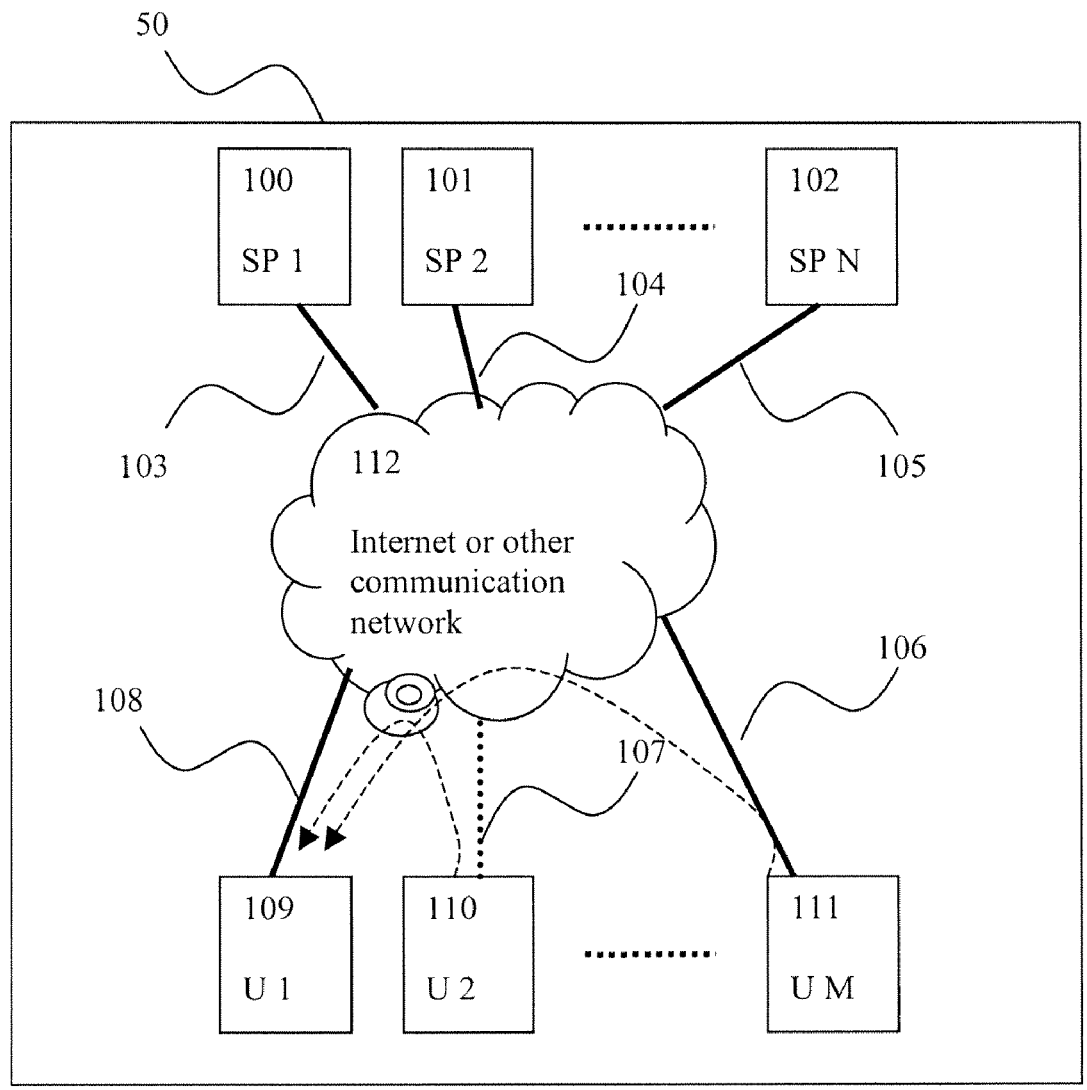
FIG. 3 illustrates a communication system where a number of different communication networks and nodes are interconnected according to the current state of the art.

FIG. 3 illustrates a communication system 50 where a number of different communication networks and nodes are interconnected according to the current state of the art. In principle, the system is similar to the communication system 10, however the communication devices 109, 110, and 111 can communicate with each other (directly or indirectly), for example user M and U2 may notify user U1 what digital objects are currently conveyed in user M's and U2's active digital object channel(s). This allows U1 to be informed about a plurality of digital object channels without having to monitor them individually. Example of such systems is "Radio Tracker" made by RapidSolution Software AG, Germany.

Applicants have therefore identified several improvements over the current state of the known art described hereunder.

The System

The following content presentation systems described in FIGS. 4-10 may include instructions executed on a computer. These systems may be or include a computer system. They may be described in the general context of computer-executable instructions, such as program modules, being executed by a computer. Generally, program modules include routines, programs, objects, components, data structures, etc. that perform particular tasks.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The following content presentation systems may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. For some aspects of the invention, such as for the transfer of payments, the communications infrastructure may include networked systems such as the Electronic Funds Transfer (EFT) network, trade exchanges, and other communication channels known in the industry for implementing trading transactions (which may include settlement operations) such that those described herein.

Although many other internal components of the computer are not shown, those of ordinary skill in the art will appreciate that such components and the interconnections are well known. Accordingly, additional details concerning the internal construction of the computer need not be disclosed in connection with the present invention.

Figure 4:
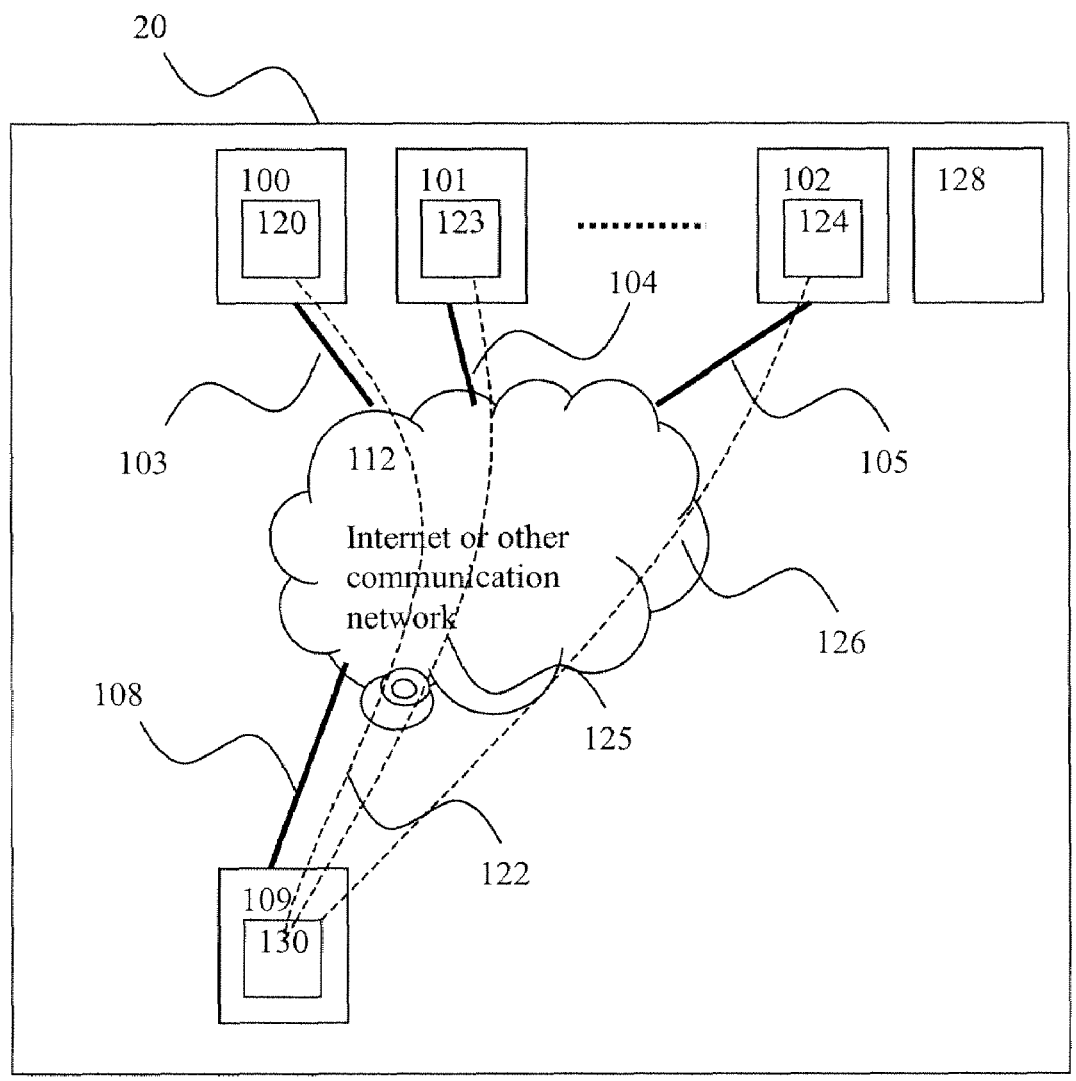
FIG. 4 illustrates a detailed communication system according to one aspect of the invention where a number of different communication networks and nodes are interconnected according to variants of the present invention.

FIG. 4 shows an improved communication system 20 according to aspects of the invention, where user U1 with communication device 109 may set up a communication channel 122 with SP1, communication channel 125 with SP2 and so on until the communication channel 126 with SP K. User U1 may have an improved application 130 installed and running on her communication device. The application 130 may connect to channel feed applications on the object servers 100-102 via the channels 122, 125, and 126, the channels 122, 125, and 126 being fed with digital objects via the channel feed applications 120, 123, and 124. As digital objects are passed from the channel feed applications 120, 123, and 124, via the channels 122, 125, and 126 to the application 130, the later may render or store the digital objects. Rendering may be made in real-time, near real-time, or substantially later.

The channel 122 may be conveyed over the communication channel 108, the communication network 112, and the communication link 103. The channel 125 may be conveyed over the communication channel 108, the communication network 112, and the communication link 104. The channel 126 may be conveyed over the communication channel 108, the communication network 112, and the communication link 105.

According to some aspects of the invention, the application 130 may connect to an arbitrary number of digital object channels. In particular, the application may connect to K digital object channels. The advantage with this solution is that the likelihood of encountering a digital object that is desired would approximately increase by a factor of K compared to system 10. Unfortunately, the bandwidth requirements of the communication link 108, the load imposed by the application 130 on the communication network 112, the aggregated load imposed on the communication links 103, 104, and 105, the aggregated load on the channel feed applications 120, 123, and 124, and on the object servers 100, 101, and 102 will also increase by a factor of K. If there are M users each connecting to K digital object channels, it may be shown that the aggregated load on the communication network 112, the communication links 103, 104, and 105, the aggregated load on the channel feed applications 120, 123, and 124, and on the object servers 100, 101, and 102 will be proportional to K*M.

According to yet another embodiment of the present invention, the application 130 may be improved such that it will not obtain the digital objects directly, but instead may monitor channel digital object descriptors being provided by the information providers. In a variant of the invention, the digital object descriptors may be available at the object servers 100, 101, and 102 and are readily available in advance, real-time, or near-real-time. Upon detection of a desired digital object being transmitted in one of the monitored channels (for example, 125), the application may connect to the channel 125 and may obtain the digital object from the appropriate object server 101. This solution has a number of advantages over the previous method. For example, the bandwidth requirements may be reduced substantially on all communication links, networks, and nodes provided that the digital objects descriptors are smaller than the actual digital objects.

This embodiment may rely on advance, real-time, or near-real-time information on digital object data being available, the communication channel 108 being sufficient and available, or stringent timing requirements being imposed on the application 130. Also, if the number of monitored channels K is selected such that it is large (e.g. larger than 1000) the communication overhead may still be substantial, especially if each channel needs to be monitored with short intervals.

The monitoring of descriptors of digital objects currently being transmitted on one or more of the K channels may also be obtained indirectly from another server 128 in the communication network 20. In some of the aspects of the invention, the server 128 may be updated in advance, real-time or near-real-time by some entity or entities having knowledge of what is to/are being sent in the different channels (e.g. 120, 123, and 124).

The monitoring of descriptors of digital objects currently being transmitted on the K channels can also be obtained from other sources than 100, 101, 102 and 128.

According to another of the various embodiments of the invention, the service provider's channel feed application(s) may notify the application 130 whenever a digital object matching the search criteria is about, is, or has just been transmitted. This may allow, for example, K different channels to be constantly monitored with minimum bandwidth implication. When a triggering event is detected, a message may be sent to the application 130 that, in turn, may connect to the appropriate associated digital object channel and obtain the desired digital object. This has the advantage that the load on the communication links, the communication networks, and the application(s) may be reduced. In some of the aspects of the invention, both the application 130 and supervised channel feed application(s) may be changed to support this functionality.

According to various embodiments of the invention, one or several designated server(s), such as 128, may be used to monitor a plurality of digital object channels and, upon a triggering event, it or they may trigger the application 130 to obtain the desired digital object(s). In this case, the channel feed application may not need to be changed (provided that just said server(s) (e.g. 128) are notified else way).

Instead of the end-users connecting themselves to the information providers, embodiments and aspects of the system may connect to several information providers and monitor the incoming digital objects. The system may then relay one or several desired digital objects to the end-users thereby saving substantial bandwidth.

Figure 5:
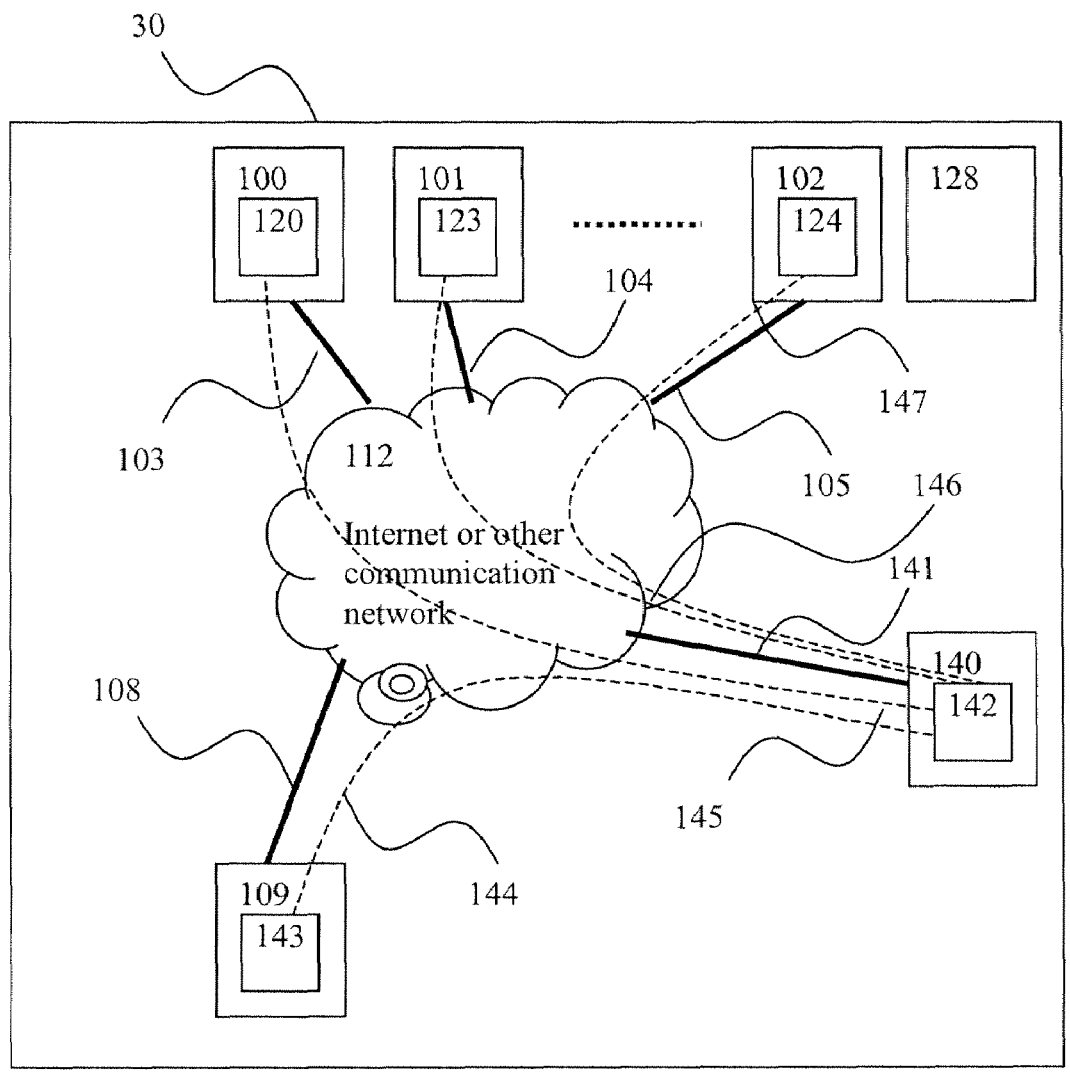
FIG. 5 illustrates a detailed communication system according to one aspect of the invention where a number of different communication networks and nodes are interconnected according to variants of the present invention.

FIG. 5 shows an improved communication system 30 according to aspects of the invention, where user U1 with communication device 109 has set-up a communication session 144 with an application 142. The application 142 may set up a communication channel 145 with SP1, a communication channel 146 with SP2, and so on until the communication channel 147 with SP K. User U1 may have an application 143 installed and running on her communication device (e.g. a browser) used for communicating with the application 142. The application 142 may connect to channel feed applications on the object servers 100, 101, and 102 via the channels 145, 146, and 147, the channel 145, 146, and 147 being fed with digital objects via the channel feed applications 120, 123, and 124. As digital objects are passed from the channel feed applications 120, 123, and 124, via the channels 145, 146, and 147 to the application 142, the later may render or store the digital objects.

The session 144 may be conveyed over the communication link 141, the communication network 112, and the communication link 108. The communication channel 145 may be conveyed over the communication link 141, the communication network 112, and the communication link 103. The communication channel 146 may be conveyed over the communication link 141, the communication network 112, the communication link 104, and so on until the communication channel 147 that is conveyed over the communication link 141, the communication network 112, and the communication link 105.

The communication device 140 may, but not necessarily, be characterised by its comparatively high computational power, data throughput, large memory and persistent storage size, and significant robustness in terms of up time.

The communication link 141 may, but not necessarily, be characterised by its comparatively high bandwidth throughput, its significant robustness in terms of up time and supervision and by its predictability of behaviour that remains largely constant over time.

According to an embodiment of the invention, the end user U1 may use an application (e.g. 143) to convey triggering conditions directly or indirectly to the application 142. The application 142 may be similar to said application 130, the application 143 may be setting or has set-up a digital object channel through session 144 from the application 142. The application 142 may continuously monitor the K digital object channels and, upon determining a triggering event, relay the appropriate digital object channel to the end-user's application 143. The application 143 may then obtain the desired digital object(s).

In order to better adapt to the end-user's or other requirements, the application 142 may optionally adapt the desired digital object(s) or the digital object channel according to said DOCA. In particular, the digital object channel may be delayed such that triggering may occur and a new object communication transmission may be commenced in a timely fashion so that the end-user's application 143 may obtain the digital object in its entirety.

According to some of the aspects of the invention, the application 142 may connect to an arbitrary number of digital object channels. In particular, the application may connect to K digital object channels. The advantage with this solution is that the likelihood of encountering a digital object that is desired would approximately increase by a factor of K compared to system 10. Unfortunately, the bandwidth requirements of the communication link 141, the load imposed by the application 142 on the communication network 112, the aggregated load imposed on the communication links 103, 104, 105, and 141, the aggregated load on the channel feed applications 120, 123, and 124), and on the object servers 100, 101, and 102 may also increase by a factor of K. However, compared to earlier devised methods herein, if there are M users each connecting to K digital object channels, it may be shown that the aggregated load on the communication network 112, the communication links 103, 104, and 105, the aggregated load on the channel feed applications 120, 123, and 124, and on the object servers 100, 101, and 102 may be proportional to K and is not influenced on the number of users M. This is a huge improvement, bearing in mind that there might be millions of potential users.

According to yet another embodiment of the present invention, the application 142 may be improved such that it may not obtain the digital objects directly, but may instead monitor channel digital object descriptors being provided by the information providers. In a variant of the invention, the digital object descriptors may be available at the object servers 100, 101, and 102 and may be readily available in advance, real-time, or near-real-time. Upon detection of a desired digital object being transmitted in one of the monitored channels (for example 146), the application may connect to the channel 146 and obtain the digital object from the appropriate object server 101. This solution has a number of advantages over the previous methods. For example, the bandwidth requirements may be reduced substantially on almost all communication links, networks, and nodes provided that the digital objects descriptors are smaller than the actual digital objects.

However, the solution may rely on advance, real-time or near-real-time information digital object digital being available, the communication channel 141 being sufficient and available, and stringent timing requirements may be imposed on the application 142. Also, when the number of monitored channels K is selected such that it is large (e.g. larger than 1000) the communication overhead may still be substantial, especially if each channel needs to be monitored with short intervals. However this solution has the advantage that communication link 141 often is better in many aspects than the communication link 108.

The monitoring of descriptors of digital objects currently being transmitted on the K channels may also be obtained indirectly from another server 128 in the communication network 30. This may require that server 128 is updated in advance, real-time, or near-real-time by some entity or entities having knowledge of what is to be sent in the different channels.

The monitoring of descriptors of digital objects currently being transmitted on one or several of the K channels may also be obtained from other sources than 100, 101, 102 and 128.

According to a variant of the invention, the service provider's channel feed application(s) may notify the application 142 whenever a digital object matching the search criteria is about, is, or has just been transmitted. This may allow, for example, K different channels to be constantly monitored with minimum bandwidth implication. When a triggering event is detected, a message may be sent to the application 142 that, in turn, may connect to the appropriate associated digital object channel and obtain the desired digital object. This has the advantage that the load on the communication links, the communication networks, and the application can be reduced. On the other hand, each and every channel feed application may need to keep track of different application(s) potentially wanting to obtain digital object(s). Both the application 142 and all supervised channel feed application may be changed to support this functionality.

According to an embodiment of the invention, one or several designated server(s), such as 128, may be used to monitor a plurality of digital object channels and upon a triggering event, it or they may trigger the application 142 to obtain the desired digital object. In this case the channel feed application may not need to be changed (provided that just said server(s) (e.g. 128) are notified else way). The communication device 140 and the communication device 128 may be located near each other or co-located or integrated in the same communication device.

One disadvantage with one or several variants of the invention described above is that this solution may only require one digital object to be obtained simultaneously and that the communication link 108 may need to be available and may need certain properties (e.g. throughput).

One obvious way of solving the problem of obtaining several digital objects simultaneously would be to have several instances of the application 143 running simultaneously or that the application 143 can handle a plurality of digital object channels. This may, however, increase the requirements on the communication link 108, the communication link 141, and the requirements of the network node 109, the network node 140 and the application 142.

Instead of relaying the objects to the end-users, embodiments of the system may store digital objects emanating from the information providers and store these digital objects in the system for later retrieval. This allows the end-user to be off-line during the actual capture of the digital objects from the information providers.

Figure 6:
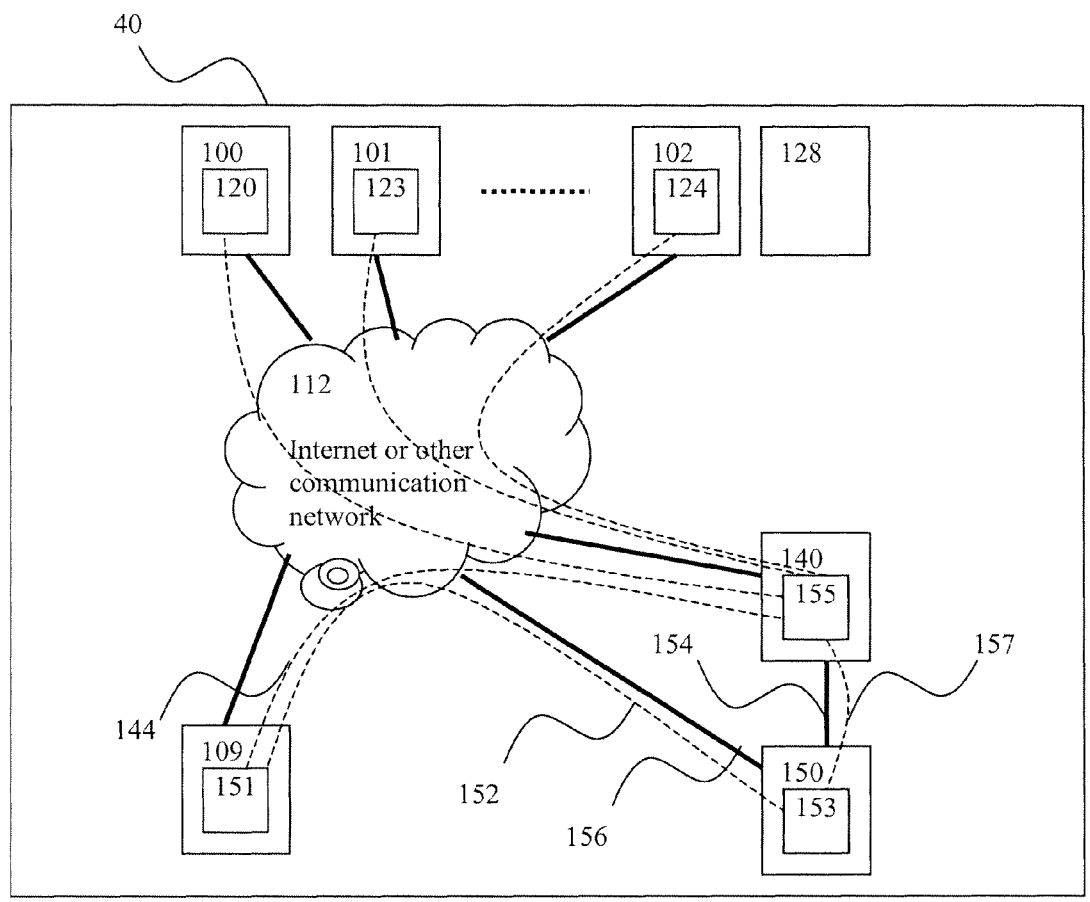
FIG. 6 illustrates a detailed communication system according to one aspect of the invention where a number of different communication networks and nodes are interconnected according to variants of the present invention.

FIG. 6 shows an improved communication system 40 according to a variant of the invention, where user U1 with communication device 109 may set-up a communication session 152 with an application 153 running at a communication device 150. The application 153 acts like a digital object store (e.g. a file system and/or a database). An application 155 may set-up a communication channel 145 with SP1, a communication channel 146 with SP2, and so on until the communication channel 147 with SP K. User U1 may have an application 151 installed and running on her communication device (e.g. a browser) used for communicating with the application 153 or application 155.

The application 155 may connect to channel feed applications on the object servers 100, 101, and 102 via the channels 145, 146, and 147, the channel 145, 146, and 147 being fed with digital objects via the channel feed applications 120, 123, and 124. As digital objects are passed from the channel feed applications 120, 123, and 124, via the channels 145, 146, and 147 to the application 155, the later may render or store the digital objects. In a variant of the invention, digital objects may be stored on the digital object server application 153.

A session 144 may be conveyed over the communication link 141, the communication network 112, and the communication link 108. A session 152 may be conveyed over the communication link 156, the communication network 112, and the communication link 108. A session 147 may be conveyed over the communication link 154. The communication channel 145 may be conveyed over the communication link 141, the communication network 112, and the communication link 103. The communication channel 146 may be conveyed over the communication link 141, the communication network 112, and the communication link 104, and so on until the communication channel 147 which may be conveyed over the communication link 141, the communication network 112, and the communication link 105.

The communication device 140 and the communication device 150 may, but not necessarily, be characterised by comparatively high computational power, data throughput, large memory, or persistent storage size and significant robustness in terms of up time.

The communication link 141, the communication link 154, and the communication link 156 may, but not necessarily, be characterised by comparatively high bandwidth throughput, its significant robustness in terms of up time and supervision, and by its predictability of behaviour that remains largely constant over time.

According to embodiments of the invention, the end user U1 may use an application (e.g. 151) to convey triggering conditions directly or indirectly to the application 155. The application 155 may be similar to said application 130, the application 155 setting or previously set-up a digital object communication link through session 157 to the application 153. The application 155 may continuously monitor the K digital object channels and, upon determining a triggering event, may obtain the desired digital object and may relay the appropriate digital object to the application 153. The application 153 may then obtain the desired digital object(s). In a variant of the invention, the application 155, upon a determining a triggering event, may relay the digital object channel to the application 153. A desired object may be streamed from application 155 to application 153.

In other aspects of the invention, desired digital objects may be associated with a particular user whenever stored (for example by associating one or several EUP to the desired digital object). This allows the system or users to identify digital object(s) that are or were requested by a certain user or collection of users.

In order to better adapt to the end-user's or other requirements, the application 153 or the application 155 may optionally adapt the desired digital object(s) or the digital object channel according to said DOCA.

In aspects of the invention, the application 155 (or the application 153) may store a plurality of users' triggering conditions. Upon detection of several triggering events pertaining to the same desired digital object (but for different users) the application 155 (or the application 153) may obtain the desired digital object once from a service provider and store the digital object for all said users. In yet another variant of the invention, the desired digital objects may only be stored once by the application 153. However, several associations may be made to the stored desired digital object. Upon association or user retrieval, certain modification of the desired digital object (e.g. source tagging further described below) may be applied.

Following one or several triggering events, user U1 may access the stored/associated desired digital objects in the application 153 (or application 155). Access can be made through numerous methods and protocols including said CP.

In variants of the inventions, the application 153 may be seen as a remote storage for user's digital objects. For example, users sometimes store digital objects on other nodes than their own user device (e.g. on a local file server, on a remote file server on the Internet or another user's computer in a home network) and the application can thus be seen as yet another external storage space.

In variants of the invention, the application 153 (or the application 155) may contain a method to authenticate users, user's communication applications, or communication devices. In this way, the system can ensure that access to desired objects are legitimate. Authentication may, for example, be done by letting the user, the user's application 151, or another user application provide one or several of the said EUP to the application 153 (or the application 155). In yet another variant of the invention, access to stored digital objects may be done using http or https. Other methods of authentication will be well known to those of skill in the art.

According to various aspects, the application 155 may connect to an arbitrary number of digital object channels. In particular, the application may connect to K digital object channels. The advantage with this solution is that the likelihood of encountering a digital object that is desired would approximately increase by a factor of K compared to system 10. Unfortunately, the bandwidth requirements of the communication link 141, the load imposed by the application 155 on the communication network 112, the aggregated load imposed on the communication links 103, 104, 105, and 141, the aggregated load on the channel feed applications 120, 123, and 124, and on the object servers 100, 101, and 102 may also increase by a factor of K. However, compared to earlier devised methods herein, if there are M users each connecting to K digital object channels, it can be shown that the aggregated load on the communication network 112, the communication links 103, 104, and 105, the aggregated load on the channel feed applications 120, 123, and 124, and on the object servers 100, 101, and 102 can be proportional to K and is not influenced on the number of users M. This is a huge improvement, bearing in mind that there might be millions of potential users.

Furthermore, one can conclude that the communication link 108 need not be established once the triggering conditions have been transferred from the end-user's application 151. Instead, the user U1 may obtain the stored/associated desired digital objects at any time and possibly with other communication devices than 109 and through other communication links than 108. This allows an increased flexibility and relaxes the requirements on the communication device 109 and the communication link 108.

According to yet another aspect of the present invention, the application 155 may be improved such that it will not obtain the digital objects directly, but may instead monitor channel digital object descriptors being provided by the information providers. In a variant of the invention, the digital object descriptors may be available at the object servers 100, 101, and 102 and may be readily available in advance, real-time, or near-real-time. Upon detection of a desired digital object being transmitted in one of the monitored channels (for example 145), the application may connect to the channel 145 and obtain the digital object from the appropriate object server 101. This solution has a number of advantages over the previous methods. For example, the bandwidth requirements can be reduced substantially on all communication links, networks and nodes provided that the digital objects descriptors are smaller than the actual digital objects and that most digital objects are not desired by any user.

However, the solution may rely on advance, real-time, or near-real-time information on digital object data being available, the communication channel 141 being sufficient and available, or stringent timing requirements imposed on the application 142. Also, when the number of monitored channels K is selected such that it is large (e.g. larger than 1000) the communication overhead may still be substantial, especially if each channel needs to be monitored with short intervals.

The monitoring of descriptors of digital objects currently being transmitted on one or several of the K channels may also be obtained indirectly from another server 128 in the communication network 40. This may require that server 128 is updated in advance, real-time, or near-real-time by some entity or entities having knowledge of what is to be sent in the different channels (e.g. 145, 146, . . . , 147).

The monitoring of descriptors of digital objects currently being transmitted on the K channels can also be obtained from other sources than 100, 101, 102 and 128.

According to a variant of the invention, the service provider's channel feed application(s) can notify the application 155 whenever a digital object matching the search criteria is about, is, or has just been transmitted. This allows, for example, K different channels to be constantly monitored with minimum bandwidth implication. Whenever a triggering event is detected, a message may be sent to the application 155 that, in turn, connects to the appropriate associated digital object channel and obtains the desired digital object. This has the advantage that the load on the communication links, the communication networks, and the application(s) can be reduced. On the other hand, each and every channel feed application may need to keep track of different application potentially wanting to obtain digital object. Both the application 155 and all supervised channel feed application may be changed to support this functionality.

According to another variant of the invention, one or several designated server(s), such as 128, may be used to monitor a plurality of digital object channels and upon a triggering event, it or they may trigger the application 155 to obtain the desired digital object(s). In this case the channel feed application may not need to be changed (provided that just said server(s) (e.g. 128) are notified else way). The communication device 140 and the communication device 128 may be located near each other, co-located, or integrated in the same communication device.

In aspects of the invention the application 153 and the application 155 are integrated into one application. In another variant of the invention the communication link 154 may be arranged such that it has significant throughput and reliability (e.g. through a local network).

In another aspect of the invention, the distance between the communication device 140 and the communication device 150 may be short, allowing cheap, reliable and high-speed communication. In one variant the communication the device 140 and the communication device 150 may be interconnected with a 1 Gbit/s local network. In yet another variant the communication device 140 and the communication device 150 are co-located and share the same memory or storage, or they coincide in the same physical machine.

In a variant of the invention, the communication link 154 may be conveyed over another communication network, such as the communication network 112.

In other embodiments digital objects may be obtained by the application 155 and stored by application 153 regardless of any triggering conditions set by the end-users. Triggering conditions may then be determined substantially later than the digital objects were stored. For example, all digital objects obtained by the application 155 may be stored by the application 153 for a certain time or indefinitely. Users may then log in to the application 153 and retrieve one or several desired digital objects. In this embodiment of the present invention, triggering conditions may be conveyed from the users application 151, via the communication session 152 to the application 153.

In other aspects of the invention, the application 153 may associate digital objects or set(s) of digital objects with a plurality of end-users. This allows the system to store files more efficiently than if each digital object were to be stored for each user.

User Interaction

Figure 7:
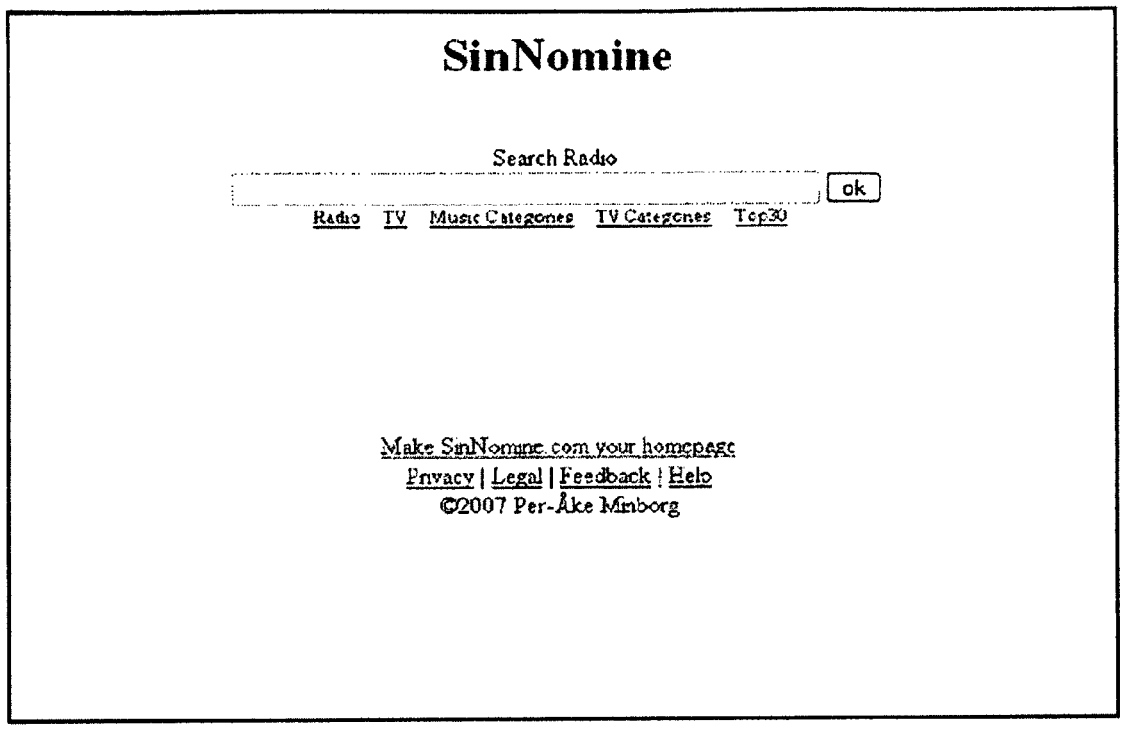
FIG. 7 illustrates a communication system according to various aspects of the invention with user interaction with the system.

In some embodiments of the invention, users may be first presented with a search page where triggering conditions can be entered. In FIG. 7, the end-user can select the category of the digital objects to obtain (i.e. Radio, TV, Music Categories, TV Categories, and Top30). The search page also may contain a text input element where a text can be entered and a search button used to initiate searching.

Figure 8:
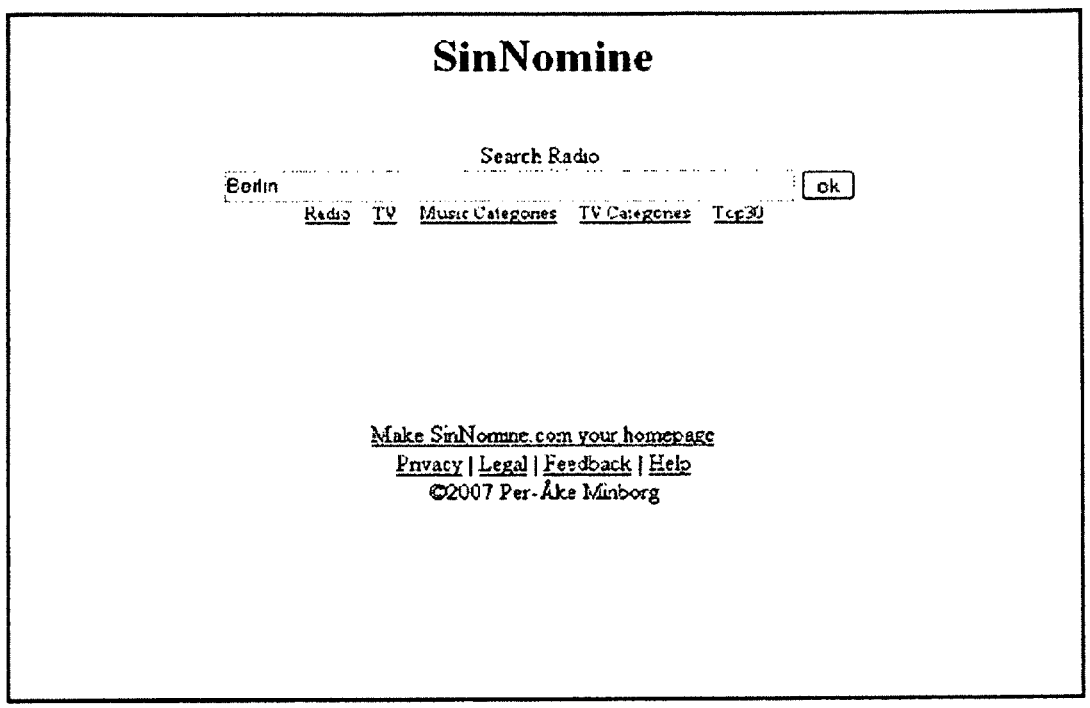
FIG. 8 illustrates a communication system according to various aspects of the invention with user interaction with the system.

In some embodiments of the invention, users can then enter the search text in the designated text input element. In FIG. 8 the user has entered "Berlin". After the desired search text is entered and the correct category is chosen, the user may click on the submit (i.e. "OK") button.

According to some aspects of the invention, when the end-user has pressed the designated submit button, the system may match or compare the search text and any combination of said EUP, DOCP, SPP, DOP, DOT, DCT and CP with any other combination of said EUP, DOCP, SPP, DOP, DOT, DCT and CP. For example, the search text may be matched against the title and the artist of songs. In variants of the inventions, songs may be readily and instantly available for search comparison (e.g. "time shifting"). In other aspects, the songs may have been previously request to be acquired by the invention and may now be presented after acquisition. In the example above, two different songs made by Berlin are shown together with basic data on the digital object (e.g. name, duration, album picture and track number). References are made from where and when the song was initially broadcasted and to third party information sources (e.g. wikipedia). The end-user may now listen to a selected part of the song (possibly with reduced coding rate) by selecting "pre-listen" in order to manually establish a correct match (e.g. before the user selects to perform another action). By clicking "download" the song is moved from the user's time shift buffer to local store (e.g. the computer's harddisk or the wireless handset's media card). By clicking "play full song" the song is played locally at the end-users communication device. By clicking "Buy song" the user is redicted to another page where she can buy a digital object representing the song (e.g. with much better quality than the song found in the search).

Recording Grid

Figure 10:
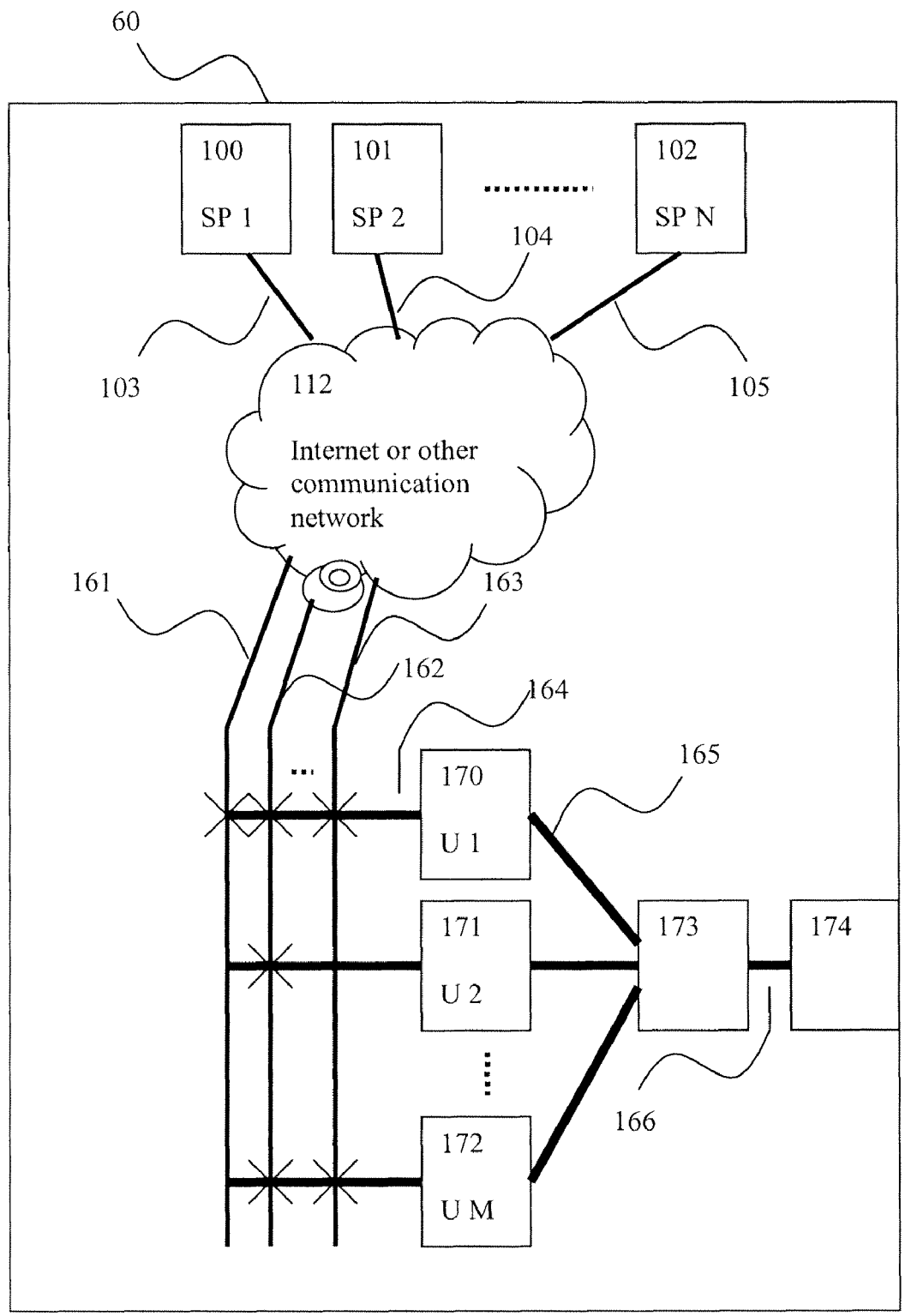
FIG. 10 illustrates a detailed communication system according to one aspect of the invention where a number of different communication networks and nodes are interconnected according to variants of the present invention

FIG. 10 illustrates a communication system 60 where a number of different communication networks and nodes are interconnected according to embodiments of the invention. The service providers SP1 100, SP2 101, through SPN 102, are, via the corresponding communication links 103, 104, and 105 and the communication network 112, connected to the media object buses 161, 162, and 163, the three latter collectively denoted "Antenna". For each user, U1, U2, through UM, there may be a corresponding and separate User Recording Entity (hereafter URE) that, in turn, obtains digital objects and forwards the obtained digital objects to intermediate or final storage 174. In the figure above, U1's URE 170 is recording digital objects obtained from the Antenna via the communication channel 164. U2's URE 171 is recording digital objects obtained from the Antenna and U3's URE 172 is recording digital objects obtained from the Antenna. After recording, the recorded digital objects may be sent to the compressor 173 via a communication link 165. After compression, the recorded data objects may be sent to intermediate or final storage 174 via a communication link 166. In a variant of the invention, the users' UREs may be located close to the Antenna and substantially distant from the users' location. In other variants of the present invention, the UREs may be located on one or several central servers. In still other aspects of the invention, a plurality of UREs may be located on a central server which are connected to a storage entity 174, possibly via an optional compressor 173 using high bandwidth connections. In other aspects, the high bandwidth connection is a network with 100 Mbit/s throughput, in still other variants of the invention the high bandwidth connection is a network with 1 Gbit/s throughput or higher. In another embodiment of the invention, a single URE may be located substantially away from other UREs in the system. For example at the end user's premises.

In aspects of the present invention, digital object channel streams that are made available (by the Antenna) to UREs may provide several advantages over the known art, for example, the recordings are made individually by the different users providing legal benefits in certain jurisdictions, the handing of media is separate from other users providing "shielding" of media between users (e.g. Errors in the system where illegitimate digital objects are "leaked" from one user to another are less probable).

In one aspect of the invention, the output of the UREs may be stored individually for each user, whereby the optional compressor 173 does not compress data and the storage entity 174 stores the individual user objects separately.

In another aspect of the invention, the intermediate or final storage means 174 may be common or partly common for two or more users. Data emanating from UREs may then be compressed over the users or over the data object channels that the users are sharing. In this way, the benefit of separate recording and an efficient storage of digital objects may be achieved at the same time. Compression may be done using a plurality of methods or combination of methods.

For example, the output from each separate URE may be arranged so that output from several users are arranged in the order of digital object channel sources. For each digital object channel source, the output for that channel source of the various UREs may be compared with each other. Because the users are recording the same data source, there is a strong correlation between the different user streams from the same digital object source, compression may yield a significant reduction of the data flow while still retaining individual recording. In one variant of the invention, digital object channel flows may be recorded and arranged in blocks by the separate UREs. The later may also attach a checksum to the different blocks (e.g. Using MD5, CRC32, lateral xor) so that they may be tested for equality (with a reasonably high probability) without having to look at all the content of the individual blocks. It should be noted that according to various aspects of the invention, compression may be made such that information from different users are mixed so that each user contributes to the aggregate compressed result and thus, there is not only one copy stored that is "shared" between the users. In one variant of the invention, a change in one user's stream will result in a completely different output aggregated compressed stream.

In some of the embodiments of the invention, encryption may be employed before or after each UREs. In aspects of the invention, a set of EUPs (e.g. users' credentials and passwords) may be attached to the URE streams and may be encrypted before, during, or after compression. This allows implementation of access control to the compressed aggregated data object whereby only users that knows matching EUPs (e.g. credential/password pairs) are able to decrypt or decompress the aggregated data object. For example, users may attach their ids (=credential in this variant) and a chosen passwords to each URE stream. After compression, the system may encrypt the compressed aggregated data object with a symmetric secret key unknown by the users. Upon requesting a user's recorded Digital Object, the system may use the secret key to decrypt the aggregated data object. After decryption, the system may compare the stored credential/password pair with the credential/password pair supplied by the user upon requesting the digital object. If they do not match, access may be denied to the recorded Digital Object. If the do match, the system decompresses the aggregated data object and extracts the user's portion of the compressed data. This solution provides an integral access control mechanism to the compressed data objects whereby users are guaranteed to be authentic and their data objects are distinct.

In aspects of the invention, a compressed aggregated data object may be divided into several parts (e.g. one target group for European users and one target group for American users) whereby the aggregated data object is decompressed and the users belonging to different target groups and their corresponding credentials/password pairs are divided in to a plurality of distinct data objects. The latter being re-compressed and re-encrypted again after being split. Possibly with different secret encryption keys.

According to the various aspects of the invention, compression methods include, but are not limited to, one or one or more combinations of any of: Huffman coding, adaptive Huffman coding, Run Length; arj, zip, rar, rk, lzh, lha, pkz, 7z, bh, bz2, bza, cab, gza, j, lha, pkz, rs, sqx, gz, uha and yzl.

In a variant of the invention, the users U1, U2, through UM may have an individual set of recording markers that indicate which digital object channel a user shall record. The set of recording markers may be changed at any time. For example, in FIG. 10, U1 is recording digital objects from SP1, SP2 and SPN, U2 is recording digital objects from SP2 and UM is recording digital object from SP2 and SPN. It shall be noted that determination of recording, just as in other variants of the present invention, may be done using other means. For example, the user may enter a triggering condition for recording whereby, for example, the user enters a description matched against said DOP, DOCP, SPP, DOT, CP or DCT. Useful examples include, but are not limited to, entering a set of channels to record, entering a set of music or TV genre to record, enter a certain artist to record, or entering the name of a certain TV series to record.

It should be noted that a URE may be realized using a common process for a plurality of users, a process for each user, or a combination thereof. The URE can advantageously be implemented using DSP or GPU (Graphics Processing Unit) technology that can provide high memory throughput or parallel processing. Presently, there are GPUs with over 512 parallel hardware threads than can execute concurrently. Aspects of the present invention may include solutions where blocks of users (e.g. the number of parallel threads) are scheduled sequentially. For example, using a 512 thread GPU, digital objects that are available on the Antenna are accessed by 512 URE at the same time or almost at the same time. After all threads have executed, a new set of 512 users' UREs may be scheduled again until all users have recorded what is currently on the Antenna. After this, new data that may have been buffered by the system are made available at the Antenna an the process starts over again with the first block of 512 users' UREs.

The temporary data storage or communication that may be required between the Antenna and the plurality of UREs may be implemented using several technologies including but not limited to: shared memory, memory mapped files, files, pipes, sockets, named pipes, and graphic card memory. The same technologies as recently stated just above may also be used for temporary storage or communication between the UREs and the optional compressor 173 and the UREs and the storage entity 174.

With respect to one or several embodiments or aspects of the invention described above, one or several further improvements may be made, one or several observations may be seen or variants of the invention can be described, as will be devised below.

Firewalls may be present between the end user's communication device 109 and the communication network 112 or can elsewhere be present in communication networks. Streaming media are sometimes conveyed over TCP/UDP port numbers or are using communication protocols that are blocked by firewalls. In a variant of the invention, the communication system 30 and the communication system 40 can allow digital object to be sent on other ports and using other communication protocols than originally used. Thus, decreasing the probability that a firewall will block any desired digital objects.

Using a collection of triggering conditions, it is possible for one or several service providers to select digital objects to be sent on one or several digital object channels such that the likelihood of triggering events will be increased (or even maximized) or such that the number of triggering events will be increased (or even maximized). The collection of triggering conditions may be selected arbitrarily, for example to satisfy a given set of users (e.g. having a certain set of said EUP, for example are from a certain country). This allows, for example, one or several entities operating a system according to one or several variants of the invention to also be service providers or associate with one or several existing service providers; the service providers being able to present more appealing digital object channels and, at the same time, improving end-users probability of obtaining desired digital object.

The system may store one or several properties of the digital objects, the service providers, or the digital object properties and associate and store them in a database. Association and storage may include any combination of said DOCP, SPP, DOT, CP, DCT and DOP. The associations and stored data are referred to as History below. For example, in a simple case, History could be the digital content (e.g. mp3 part) of a song together with the artist and title and time of recording of the song.

To provide guidance to the end-users, it is possible to disclose certain information elements that can be derived within the system. This may include, but is not limited to, a list of the most common search criteria (e.g. triggering conditions), a list of the most common digital objects being provided by a set of service providers (e.g. all service providers or all service providers in a country or any other certain set of said SPP), a set or digital object channels (e.g. having a certain set of said DOCP, for example rock channels), or a list of the most common desired digital objects that have been obtained by a set of users (e.g. having a certain set of said EUP, for example all users) and any said History. This allows implementation of top lists, most-played lists, most searched for lists, most rendered by users lists etc.

Upon entering triggering conditions, end users may enter (or the system may set) the number of digital object channels that shall be allocated and supervised by the system for that particular user or set of triggering conditions. The system may then be arranged such that said History is used to provide the most likely way to provide desired object with respect to the triggering conditions and/or with respect to other optimization criteria. For example, the system may know where "Mary has a little lamb" has been played most frequently. In some jurisdiction, the number of monitored digital object channels may influence the legality of one or several variants of the invention. It is possible for the system to, depending on an end-users jurisdiction or other said EUP, adapt the number of digital object channels automatically.

In certain jurisdictions, where the use of certain embodiments or aspects of the present inventions may be prohibited, the system may select other embodiments or aspects of the invention that are deemed to be legal. Asserting one or several of said EUP, DOCP, SPP, DOP, DOT, CP and DCT may constitute a system automatic selection of invention embodiment or aspect. For example, downloading of objects to an external file system according to the communication system 40 might be illegal whereas downloading to a local file system according to the communication system 30 might be legal. Selection of invention variant includes any and all variations and permutations described herein.

In certain jurisdictions, where the use of certain variants of the present inventions may be prohibited, the system may, instead of obtaining the objects itself, provide end-users with guidance on which digital object channel(s) they should monitor given certain triggering condition(s). For example, this may be done matching the triggering condition(s) with said History. This may also be applied to other jurisdictions, regardless if variants are also legal.

It is possible to significantly delay or even capture digital object channels so that an end-user can search backwards in time and thus be more likely obtain desired digital objects much faster than having to wait and examine each digital object arriving from the different channels in real time. For example, by delaying 1000 digital object channels for two weeks (and assuming that each digital object is in average 5 minutes long) up to $1000*60*24*7*2/5=4$ million digital objects may be instantly compared against a triggering condition and the resulting list potentially presented to the end-user in less than 1 second. In a variant of the present invention, objects may have ensured persistence in the system for only a certain predetermined time, after which they are eligible for automatic deletion by the system unless they have been accessed by the user or users. In another variant of the invention, the predetermined time is two days. In another variant, unused digital objects are removed after two weeks. In yet another variant of the present invention, unused objects are deleted after one year.

In other aspects of the invention, the delay depth applied for a certain end-user may be adapted individually with respect to any combination or permutation of one or several of said EUP, DOCP, SPP, DOP, DOT, CP and DCT. It is noted that this solution would require a significant storage space if the delay time is high. In the example above (and if each digital object is 5 Mbyte in average), the total space would be $4M*5$ Mbyte=20 TByte. In an embodiment of the invention, only a limited set of physical copies of the delayed digital objects may be used for a plurality of end-users such that the physical copies are less than the number of plurality of end-users. For example, there may be only one copy of the delayed digital objects for all end-users. In yet another aspect of the invention, certain properties of the delayed digital objects (e.g. said EUP to be associated with the digital object) may be stored separately from the delayed digital object and subsequently applied to the digital objects preceding any transfer of the desired digital object to the end-users device(s). This ensures that the digital object delay storage size can be minimized while still allowing personalized digital objects. For example, the end user's name may be appended to the digital object just before it is sent to the end user. In a variant of the invention the delay time is 10 hours. In another variant the delay time is 2 weeks. In yet another variant the delay time is several years.

As been described in and under FIG. 10, compression can be applied to digital objects or DOPs. Upon storing one or several digital objects or DOP, the Digital object(s) or DOP(s) can be encrypted. This ensures that the digital objects remain personal which can be important in some jurisdictions. Encryption (e.g. DES) can be made using a key from one or several of said EUP, DOCP, SPP, DOP, DOT, CP and DCT or by using any other secret key.

In several embodiments of the invention, objects may be transferred from a system to one or several end-users. Provided that there are several end-users that are to receive a particular digital object, the system may use peer-to-peer file distribution protocols (e.g. BitTorrent, Fast Track, Direct Connect, Gnutella and eDonkey) to distribute the digital object. The system may then send the digital object in significantly less times than if each user received the digital object from the system directly and individually. For example, if 1000 end-users are to receive a certain digital object, it may be sufficient for the system to provide the digital object just 1 to 10 times depending on how the receiving end-users are acting. Thus, the outgoing bandwidth demands can be reduced by a factor of 100 to 1000.

Upon storing one or several digital objects, the Digital object(s) can be attributed with one or several properties pertaining to digital rights management (DRM). This ensures that the digital objects remains protected and can only be used as allowed in one or several associated jurisdictions. Determination of DRM and selection of DRM parameters can be made using one or several of said EUP, DOCP, SPP, DOP, DOT, CP and DCT. For example, digital objects may only be used on the communication device 109 on which it was originally obtained.

The number of digital object channels can be increased by allowing the system to obtain digital objects indirectly from other sources including but not limited to FM, AM, TV, Cable TV, Wire, Satellite or DAB receivers. Said other sources may be located in a plurality of geographic locations (substantially apart) to further increase the number of digital channels available. When connecting basically analogue type of other sources (e.g. FM), media adapters may be used to digitize objects and to feed them into one or several data communication networks. Objects emanating from digital other sources may also be adapted before they are fed into one or several data communication networks (e.g. by employing DOCA). The use of certain sources may be controlled by using one or several of said EUP, DOCP, SPP, DOP, DOT, CP and DCT. For example, digital other objects might only be obtained from other sources located in an end user's home country.

Upon storing, obtaining, or otherwise handling one or several digital objects, one or several variations of the invention may employ said DOCA.

Sometimes the communication link 108 may have limited performance. In order to improve the user experience for example, to allow the user to determine a successful download of a digital object that is large without having to download the entire digital object, the system can generate or obtain one or several said DOP from the desired digital object. For example, a thumbnail can be generated for a large photo, the 8 first seconds of audio may be generated, a sequence of representative scenes from a video film can be generated, or a more aggressive digital coding can be applied. The user can use this reduced representation of the desired digital object to establish successful download, before the entire desired digital object is obtained over the communication link 108.

According to an aspect of the invention, applications (such as 155 and 142) may present a list of the most commonly obtained objects (e.g. a top 30 list).

Sometimes a plurality of digital objects match a certain triggering condition. This may happen especially if searching can be made over a significant time period. In an embodiment of the invention, desired digital objects can be presented in a certain order to the end user such that the most relevant digital objects are shown first. Sorting can be made on any number of, combination of or comparison of said EUP, DOCP, SPP, DOP, DOT and DCT or the triggering conditions previously entered by the user. For example, digital objects with the highest bit-rate multiplied with a weight factor for the digital object's coding type may constitute the order of presentation. For example, audio objects with the best quality are shown first such that 128 kbit/s aac+coded objects are shown before 128 kbit/s mp3 coded objects which are shown before 96 kbit/s mp3 coded objects. Also, the number of times a digital object, or any of the DOP of digital objects, has been entered as a triggering condition or has been downloaded may be weighted in during sorting. For example, songs that are more often requested may be presented above songs that are less frequently requested.

An application may sometimes connect to a plurality of digital object channels emanating from the same information provider. Sometimes a digital object channel may carry several digital objects in parallel.

Quality Improvement

Digital objects obtained over digital object channels are often modified compared to the original digital objects (e.g. movies can have ads and music may be overlaid and/or replaced by a talking radio channel host). These modifications are often not desired by the end-user. To overcome this drawback, several solutions are devised as described hereunder:

The system may have original digital objects or representations or signatures of original digital objects. Whenever a digital object is received by the system, the obtained digital object (or its corresponding representation and/or signature) may be compared with a plurality of original digital objects, representations, or signatures to find a match or a most likely match. Upon match, several associated parameters may be obtained from the database or is extracted from the original digital object, its representation, or signature. The parameters describe the start and end of the digital object such that the system is able to trim any trailing or tailing redundant information (such as talk or other song in a radio channel). Thus, the system can produce a digital object more like the original digital object even though it was distorted prior to or while being sent through the digital object channel. In a variant of the invention, information can also be trimmed in the middle of the received digital object in the same way. It should be noted that a plurality of sections might be excluded. For example, commercial ads may be removed from a digital film. It should further be noted that the trimming of redundant sections may be done by spanning or seamlessly joining sections. The modifications being made such that any clicking or jerking is suppressed. For example, by gradually blending from one section to another or by cross fading audio content.

According to another variant of the invention, the general method and apparatus of applying the above scheme to restore any digital object (obtained by any means) by applying a known other digital object, a corresponding representation, or signature can be applied. For example, a user may have an application that goes through one or several digital object and improves the digital objects such as they will more resemble the original digital objects. The application may have built in original digital objects, corresponding representations and/or signatures or the application can access a communication network (e.g. the Internet) to obtain the original digital objects, corresponding representations and/or signatures over the communication network.

Digital Object Delay

By routing the media stream through a delaying network element and the signalling of the associated meta-data directly without any delay, several advantages may be obtained. Some of the problems associated with receiving a certain media stream in a timely fashion are stated below.

Firstly, some media senders delay the meta-data so that it will arrive after the corresponding stream already has been started.

Secondly, if the meta-data is not known and is determined by the system, an inherent delay is imposed from the start of the stream to the calculation and matching of a digital signature.

Thirdly, if the media stream may obtained indirectly from other sources including but not limited to FM, AM, TV, Cable TV, Wire, Satellite or DAB. The adaptation and determination of meta-data may be delayed.

Fourthly, applications and communication channels necessary to receive the media stream often need a certain set-up time to start, connect, allocate communication resources, allocate storage resources and connect to the stream.

Fifthly, the end of the media stream may not be detected in real time. Most algorithms are likely to incorporate redundant data at the end of the captured portion.

By introducing a delay in the media stream, the system will have time to inform the receiving media stream application to start capturing the media stream sufficiently in advance so that the media stream can be captured in its entirety.

In some of the aspects of the invention, the system determines the actual start of the desired part of the media stream just as it enters the system or within a time less than the media stream delay imposed by the system. By also observing the time when the meta-data was established and/or when the meta-data was sent to the application an indication of an estimated start time can be sent to the receiving application so it may start recording at the exact time the media stream will arrive, delayed by the system, to its receiving input.

The same approach may be used when the end of the desired media stream portion is detected. Upon detection of an end mark, the system has time to send an end of capture message to the receiving application. Again, this can be done using the same timing algorithm as described above.

In various embodiments of the invention, this may applied to all aspects and variations of the invention elsewhere described.

Source Tagging

As has been described, the system records digital media streams emanating from digital media providers and renders or stores them as digital objects. To ensure the end-user's possibility to prove that the digital objects are rightfully obtained (e.g. not illegally downloaded via a file share community) the system, according to some aspects of the present invention, marks the digital objects with certain information objects. This may be applied to all solutions devised above and is denoted Source Tagging. The marker types includes, but are not limited to the following:

The date when the digital object was recorded (local time and/or UTC where the object was recorded);

The time when the digital object was recorded. (local time and/or UTC where the object was recorded);

The country where the recording was made;

A descriptor of a geographical area where the recording was made (e.g. region, zip code, GPS coordinates);

The IP address of the network card over which the digital object was obtained;

The port number used on the network card over which the digital object was obtained (e.g. recorded) (e.g. TCP or UDP port number);

The server name of the machine that obtained the digital object (e.g. recording);

The network routing path that was used between the digital object provider and the digital object obtaining network card (e.g. Unix traceroute command output);

The resource locator (used by the recording device) at the digital object provider to select media channel/object (e.g. URL);

The date when the digital object was recorded and/or sent (local time and/or UTC where the digital object was sent);

The time when the digital object was recorded. (local time and/or UTC where the digital object was sent);

The country where the digital objects emanated from;

A descriptor of a geographical area where the digital objects emanated from (e.g. region, zip code, GPS coordinates);

The IP address of the network card from which the digital object(s) emanated from;

The port number used on the network card from which the digital objects emanated from (e.g. TCP or UDP port number);

The server name of the machine that the digital objects emanated from;

The name of the channel (e.g. the radio station name or TV channel name) that the digital objects emanated from;

The date when the digital object was requested (local time and/or UTC where the object was initially requested, e.g. at the end-users home computer.);

The time when the digital object was recorded. (local time and/or UTC where the object was initially requested);

The country where the recording was initially requested;

A descriptor of a geographical area where the recording was initially requested (e.g. region, zip code, GPS coordinates);

The IP address of the network card over which the recording was initially requested;

The port number used on the network card over which the recording was initially requested (e.g. TCP or UDP port number);

The server name of the machine that made the initial request;

The network routing path that was used between the initial recorder and the recoding controller network card (e.g. Unix traceroute command output);

A date when the digital object was otherwise handled (local time and/or UTC);

A time when the digital object was otherwise handled (local time and/or UTC);

A country otherwise related to the handling of the digital object;

A descriptor of a geographical area otherwise related to the handling of the digital object (e.g. region, zip code, GPS coordinates);

The IP address of the network card otherwise related to the handling of the digital object;

A port number used on the network card otherwise related to the handling of the digital object (e.g. TCP or UDP port number);

A server name of a machine that otherwise relates to the handling of the digital object;

A network routing path that was otherwise related to the handling of the digital object (e.g. Unix traceroute command output);

Any said EUP;
Any said DOCP;
Any said SPP;
Any said CP;
Any said DOT;
Any said DCT;
Any said DOP;

Any information element obtained from an external or internal database in view of anything above;

Or any possible permutation and/or combination of one or several of the above said marker types.

In yet another aspect of the invention, the system is arranged such that the markers are attached to the obtained digital object in one or several ways, including but not limited to:

Setting one or several meta-tags in the digital object according to one or several of the markers. This allows, for example, some media players to show the meta-tags while the digital object is rendered;

Setting the name used (e.g. the file name) for the digital object to reflect one or several markers;

Inserting one or several markers into the actual digital object such as they will be rendered upon rendering the digital objects (e.g. appending audio to an audio objects describing the markers in plain English or inserting the markers as text in a video object);

Inserting one or several markers into the actual digital object such as they will not be rendered upon rendering the digital objects (e.g. invisible watermarks in a picture or insertion in non-renderable portions of a video clip);

Setting another digital object to reflect the markers and associating it with the obtained digital object. This includes, but is not limited to, directly or indirectly referencing a URI, linking, or introducing database association;

Or any possible permutation and/or combination of one or several of the above said methods to attach markers;

This may be applied to all aspects and embodiments the invention elsewhere described. For example, digital object providers in the communication system 10 may alter the digital objects and/or the digital object channel when end users are directly connected as described above.

Attachment of Additional Information Objects

So far, information objects related to the process of ordering, producing, or obtaining digital objects has been handled in terms of attaching or associating markers (related to the process of ordering, producing and obtaining digital objects) to the obtained digital object. It is also possible to attach or associate other digital objects to the obtained digital object; the attached or associated digital objects being possibly uncorrelated to the ordering, producing or obtaining of the obtained digital object. The other digital objects can include, but are not limited to:

Digital information objects that are of commercial nature (e.g. ads). This includes, but are not limited to, banners, pictures, voice messages and video clips;

Digital information objects that are of informative nature (e.g. legal information). This includes, but are not limited to, banners, pictures, voice messages and video clips;

Or other digital information objects;

The digital information objects may be adapted or selected according to any of the properties of the ordering, producing, or obtaining, including but not limited to, said EUP, said DOCP, said SPP, said CP, said DCT, said DOP, the characteristics of the obtained digital object (e.g. a rock song). For example a suitable commercial ad may be selected depending on the end-users location, music style or citizenship, where the content and language is adapted to fit the end-user and/or the advertiser.

This may be applied to all aspects and embodiments the invention elsewhere described. For example, digital object providers in the communication system 10 may alter the digital objects or the digital object channel when end users are directly connected as described above.

The end-users can have a variety of different communication devices (such as 109), including but not limited to, computers, PDAs, wireless devices, mobile phones, laptops, palmtops, mp3 players and portable media players. An end-user can also be logged into a system from a plurality of different communication devices at the same time or sequentially. A system can be arranged such that it adapts the coding of the Digital Objects or the way it is conveyed (I.e. re-selection of DOCP, CP and/or DCT) depending on the communication device properties. As been described above, in aspects of the invention, the system may change the Digital Object Coding for a wireless devices so that it may be conveyed using less bandwidth (instead scarifying perceived rendering quality).

In a variation of the invention, access is limited to a certain number of simultaneous communication devices for a specific user, thereby preventing misuse whereby a user otherwise might have disclosed her login data to a large number of other persons.

In another variation of the invention, the ability to render, obtain, permanently store Digital Objects at the end-user premises or by the end-user is controlled by the system by identifying valid combinations of EUP, DOCP, SPP, DOP, DOT and/or DCT. For example, a user in Italy might not be able to store a TV program broadcasted in France but might be able to just view it, users in Malaysia might be able to stream radio songs but might not be able to save them on local store or make any duplicates, users in Turkey might be able to save radio songs, but in such cases they can only be copied three times.

Having described a number of different embodiments of the invention, it should be apparent to the person of ordinary skill that the invention has numerous benefits and advantages. For example, the invention provides a systemized framework for acquiring and presenting digital objects to a user.

Other benefits and advantages of the invention will be apparent to the person of ordinary skill in the art.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computer-implemented method of presenting requested content, gathered by a network-based server, to a remote user device, comprising:

receiving, by a network-based server and from a remote user on a remote user device connected to a network, a request for one or more media objects;

monitoring, by the network-based server, at least one digital object channel provided by one or more information providers to await occurrence of the requested one or more media object, without directly requesting the one or more media objects from the one or more information providers, wherein the monitoring comprises sending the request to one or more monitoring devices;

locating, by the network-based server and based on one or more descriptors of media content transmitted in the at least one digital object channel, at least one undedicated media stream transmitting the one or more media objects via the at least one digital object channel, the at least one undedicated media stream not being directly initiated by the network-based server, wherein the locating comprises receiving, from at least one of the one or more monitoring devices, an indication of the at least one undedicated media stream transmitting the one or more media objects;

recording, by the network-based server, a copy of the one or more media objects while the one or more media objects are being transmitted in the at least one undedicated media stream; and making the copy of the one or more media objects available, by the network-based server, to the remote user device;

wherein the remote user device is not required to stay connected to the network or the network-based server while the network-based server is locating or recording the requested one or more media objects.

2. The method of claim 1, the further comprising:
identifying one or more digital object channels likely to transmit the requested one or more media objects; and
monitoring the one or more digital object channels for the one or more requested media objects.

3. The method of claim 2, further comprising:
receiving the one or more descriptors; and
reviewing the one or more descriptors for a reference of the one or more requested media objects.

4. The method of claim 3, wherein the one or more descriptors are received from the one or more digital object channels.

5. The method of claim 3, wherein the one or more descriptors are received from a third party instead of the one or more digital object channels.

6. The method of claim 3, wherein the one or more descriptors are received in advance of the one or more media objects being transmitted in the at least one undedicated media stream.

7. The method of claim 3, wherein the one or more descriptors are received in real-time as the one or more media objects begins transmission in the at least one undedicated media stream.

8. The method of claim 3, wherein the one or more descriptors are received in near-real-time as the one or more media objects is being transmitted in the at least one undedicated media stream.

9. The method of claim 1, wherein at least one of the one or more monitoring devices is affiliated with at least one of the one or more digital object channels.

10. The method of claim 1, the making available comprising:
formatting the copy of the one or more media objects for presentation to the remote user device according to one or more formatting rules; and
presenting the formatted copy to the remote user device.

11. The method of claim 10, wherein the one or more formatting rules are specified by the remote user device.

12. The method of claim 10, further comprising determining the location of the remote user, and wherein the one or more formatting rules are based upon the location of the remote user.

13. The method of claim 12, further comprising determining usage rights of the remote user based on the location of the remote user, and wherein the one or more formatting rules are further based upon the usage rights.

14. The method of claim 1, further comprising determining the location of the remote user, wherein the at least one digital object channel monitored is limited based on the location of the remote user.

15. The method of claim 14, further comprising determining usage rights of the remote user based on the location of the remote user, and wherein the at least one digital object channel monitored is further limited based on the usage rights.

16. The method of claim 1, further comprising buffering the at least one undedicated media stream.

17. A computer-implemented system for presenting requested content, gathered by a network-based server, to a remote user device, comprising:
at least one processor and at least one memory or storage medium;
a user communication module connected to a network for receiving, at a network-based server and from a remote user device connected to said network, a request for a media object;
a media location module, in communication with said user communication module, for monitoring at least one digital object channel provided by one or more information providers to await occurrence of said requested media object, without directly requesting said media object from the one or more information providers, and for locating, based on one or more descriptors of media content transmitted in the at least one digital object channel, an undedicated media stream transmitting said media object via the at least one digital object channel, the undedicated media stream not being directly initiated by the media location module, wherein the media location module sends the request to one or more monitoring devices and receives, from at least one of the one or more monitoring devices, an indication of the undedicated media stream transmitting the media object;
a recording module, in communication with said media location module, for recording a copy of said media object while said media object is being transmitted in said media stream; and
a user presentation module, in communication with said recording module, for presenting said copy of said media object to said remote user device;
wherein said media location module triggers said recording module upon locating said media object in said media stream; and
wherein said remote user device does not need to be connected to said computer-implemented system or said network during the execution of said media location module or said recording module.

18. The system of claim 17, wherein the media location module identifies one or more digital object channels likely to transmit the media object and monitors the one or more digital object channels for the media object.

19. The system of claim 18, wherein the media location module monitors by receiving the one or more descriptors and reviewing the one or more descriptors for a reference of the media object.

20. The system of claim 17, wherein the one or more descriptors are received from the one or more digital object channels.

21. The system of claim 17, wherein the one or more descriptors are received from a third party instead of the one or more digital object channels.

22. The system of claim 17, wherein the one or more descriptors are received in advance of the media object being transmitted in the undedicated media stream.

23. The system of claim 17, wherein the one or more descriptors are received in real-time as the media object begins transmission in the undedicated media stream.

24. The system of claim 17, wherein the one or more descriptors are received in near-real-time as the media object is being transmitted in the undedicated media stream.

25. The system of claim 17, wherein at least one of the one or more monitoring devices is affiliated with at least one of the one or more digital object channels.

26. The system of claim 17, wherein the user presentation module formats the copy of the media object for presentation to the user according to one or more formatting rules and presents the formatted copy to the remote user device.

27. The system of claim 26, wherein the one or more formatting rules are specified by the remote user device.

28. The system of claim 26, wherein the one or more formatting rules are specified by one or more usage rights of the remote user.

29. A non-transitory computer-readable storage medium with instructions contained thereon, said instructions instructing a computer to:

receive, by a network-based server and from a remote user connected to a network, a request for a media object;

monitor, by the network-based server, at least one digital object channel provided by one or more information providers to await occurrence of the requested media object, without directly requesting the media object from the one or more information providers, wherein the monitoring comprises sending the request to one or more monitoring devices;

locate, by the network-based server and based on one or more descriptors of media content transmitted in the at least one digital object channel, an undedicated media stream transmitting the media object via the at least one digital object channel, the at least one undedicated media stream not being directly initiated by the network-based server, wherein the locating comprises receiving, from at least one of the one or more monitoring devices, an indication of the at least one undedicated media stream transmitting the one or more media objects;

record, by the network-based server, a copy of the media object while the media object is being transmitted in the undedicated media stream; and make the copy of the media object available, by the network-based server, to a remote device of the remote user;

wherein the remote user is not required to stay connected to the network or the network-based server while the network-based server is locating or recording the requested media object.

* * * * *